April 18, 1967 R. DE CAMPO ETAL 3,315,233

SELF-ADDRESSING AND SELF-ASSIGNING MEMORY SYSTEM

Filed Oct. 1, 1963 21 Sheets-Sheet 1

INVENTORS
RAUL de CAMPO
JOHN J. FILDES
BY [signature]
ATTORNEY

STORE FIG. 3

RETRIEVE FIG. 4

April 18, 1967 R. DE CAMPO ET AL 3,315,233

SELF-ADDRESSING AND SELF-ASSIGNING MEMORY SYSTEM

Filed Oct. 1, 1963 21 Sheets-Sheet 6

April 18, 1967 R. DE CAMPO ETAL 3,315,233

SELF-ADDRESSING AND SELF-ASSIGNING MEMORY SYSTEM

Filed Oct. 1, 1963

21 Sheets-Sheet 12

April 18, 1967 R. DE CAMPO ETAL 3,315,233

SELF-ADDRESSING AND SELF-ASSIGNING MEMORY SYSTEM

Filed Oct. 1, 1963 21 Sheets-Sheet 16

April 18, 1967 R. DE CAMPO ETAL 3,315,233

SELF-ADDRESSING AND SELF-ASSIGNING MEMORY SYSTEM

Filed Oct. 1, 1963 21 Sheets-Sheet 17

April 18, 1967 R. DE CAMPO ET AL 3,315,233

SELF-ADDRESSING AND SELF-ASSIGNING MEMORY SYSTEM

Filed Oct. 1, 1963 21 Sheets-Sheet 18

April 18, 1967 R. DE CAMPO ETAL 3,315,233

SELF-ADDRESSING AND SELF-ASSIGNING MEMORY SYSTEM

Filed Oct. 1, 1963 21 Sheets-Sheet 21

United States Patent Office 3,315,233

Patented Apr. 18, 1967

3,315,233

SELF-ADDRESSING AND SELF-ASSIGNING MEMORY SYSTEM

Raul de Campo and John J. Fildes, Poughkeepsie, N.Y., assignors to International Business Machines Corporation, New York, N.Y., a corporation of New York Filed Oct. 1, 1963, Ser. No. 313,028

12 Claims. (Cl. 340—172.5)

This invention relates to a data storage system. More particularly, the invention relates to a fully automatic self-addressing and self-assigning memory system.

A memory addressing problem results from the need to associate a customer's identification of data with the address of the memory at which the data is stored. This problem has been handled in the past through direct addressing, mathematical manipulation, table look-up, or a combination of these three techniques. None of these methods has been completely satisfactory.

An addressable memory from its very nature is broken into memory units of fixed size which are associated with each of the addresses. Since a customer's records vary in size from the very small to the very large, these fixed size units, whatever their size, will be too large for some records and too small for others. The problem, therefore, is to store these records with the assurances that the memory units are fully packed, and the data is easily retrievable.

It is the principal object of the invention to provide a memory addressing system which is self-executing, which will make efficient use of the memory, and from which data can be retrieved quickly and with certainty.

The objectives of the invention are attained by resort to a novel augmented indirect addressing method, in which successive parts of a customer's data identifier are combined with a succession of partial indirect addresses to form new addresses, and eventually the desired address.

In particular, the novel system herein comprises a reiterative technique for generating and locating addresses. The number of iterations required depends on the number of characters in the customer's data identifier, or a predetermined part of the identifier. There will be one iteration for each character in the identifier or a selected part thereof. When the last character of the identifier has been used, the address located with it will be the address of the location where the data is stored.

Each iteration take a partial indirect address and combines it with a character from the customer's data identifier to form a new address. This new address is either the address of the partial indirect address to be used in the next iteration or, if the last identifier character has been used, the address of the desired data.

Other objectives, features and advantages of the invention will be apparent from a consideration of the following specification when viewed in light of the drawings forming a part hereof.

In the drawings:

FIGS. 1A and 1B, taken together, constitute a schematic block diagram of the self-addressing memory system herein;

Figure 5:
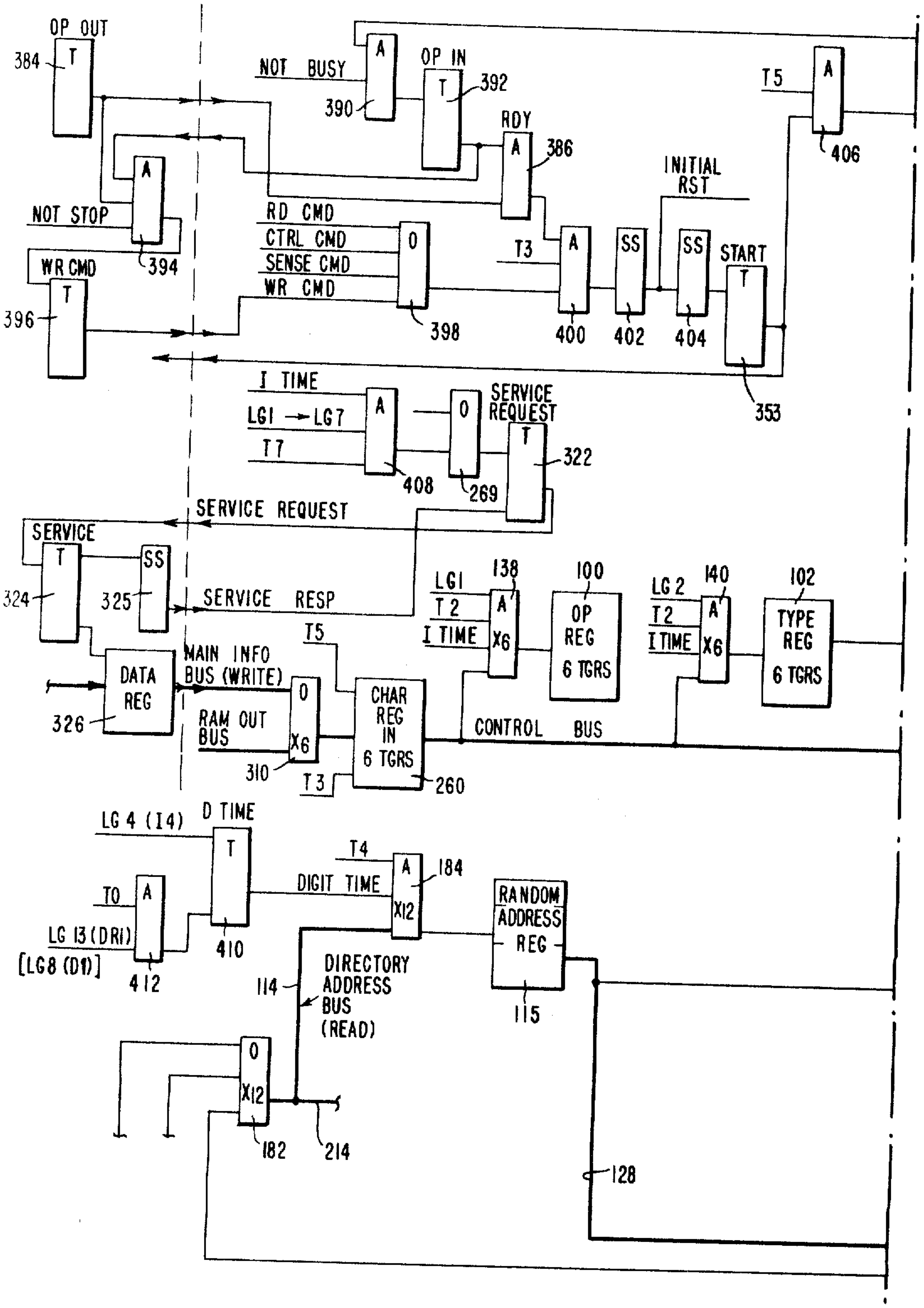
Figure 6:
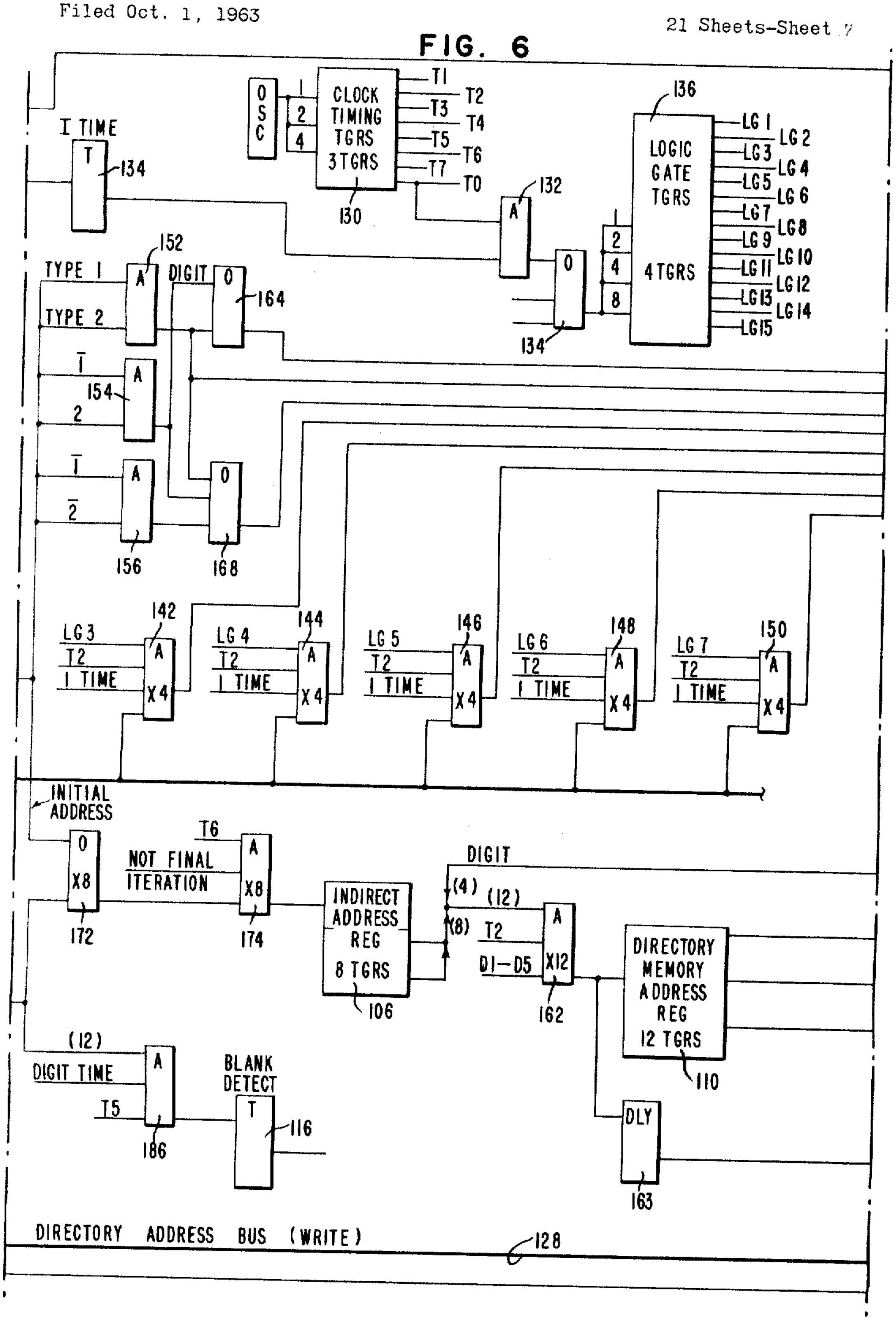
Figure 7:
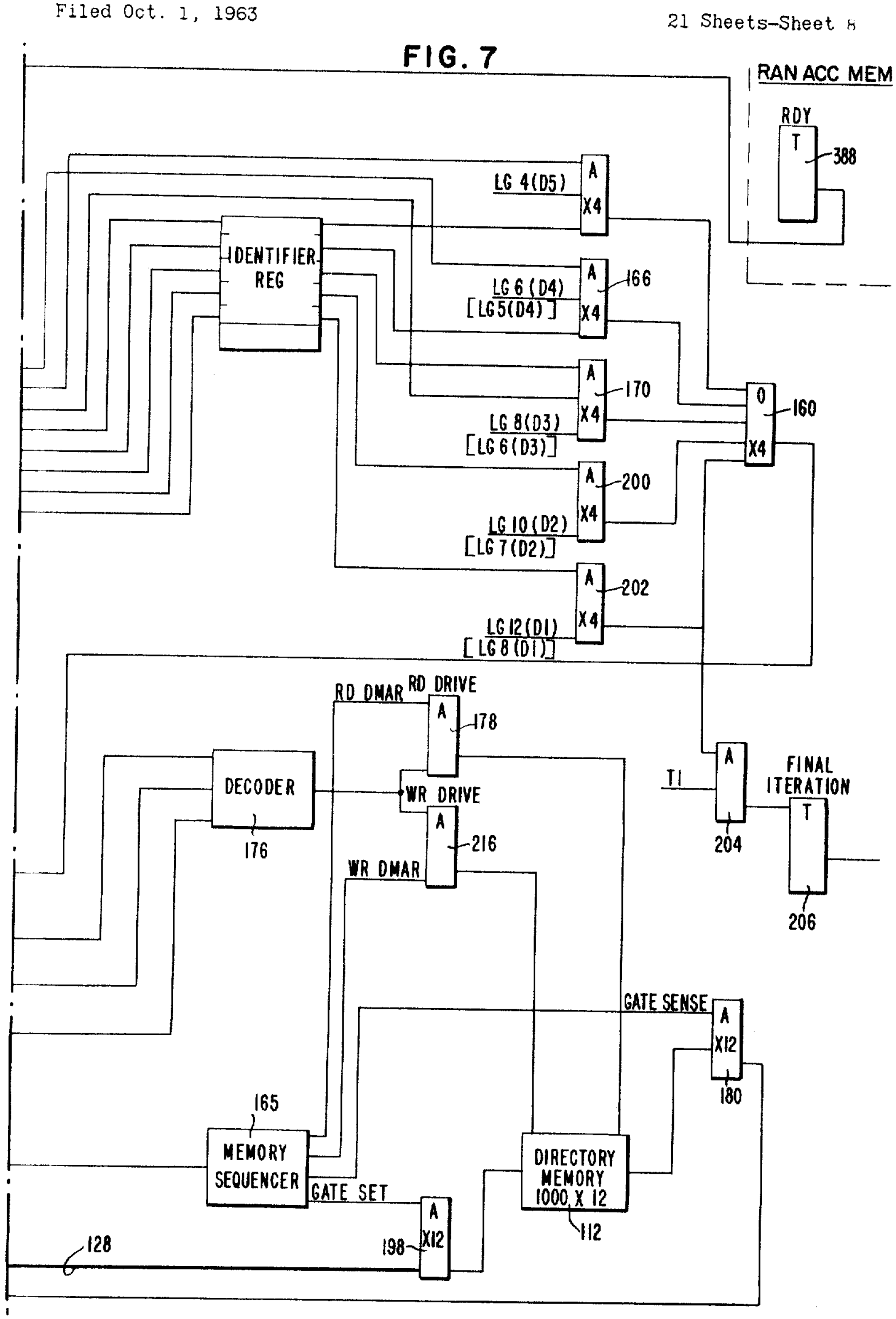
Figure 8:
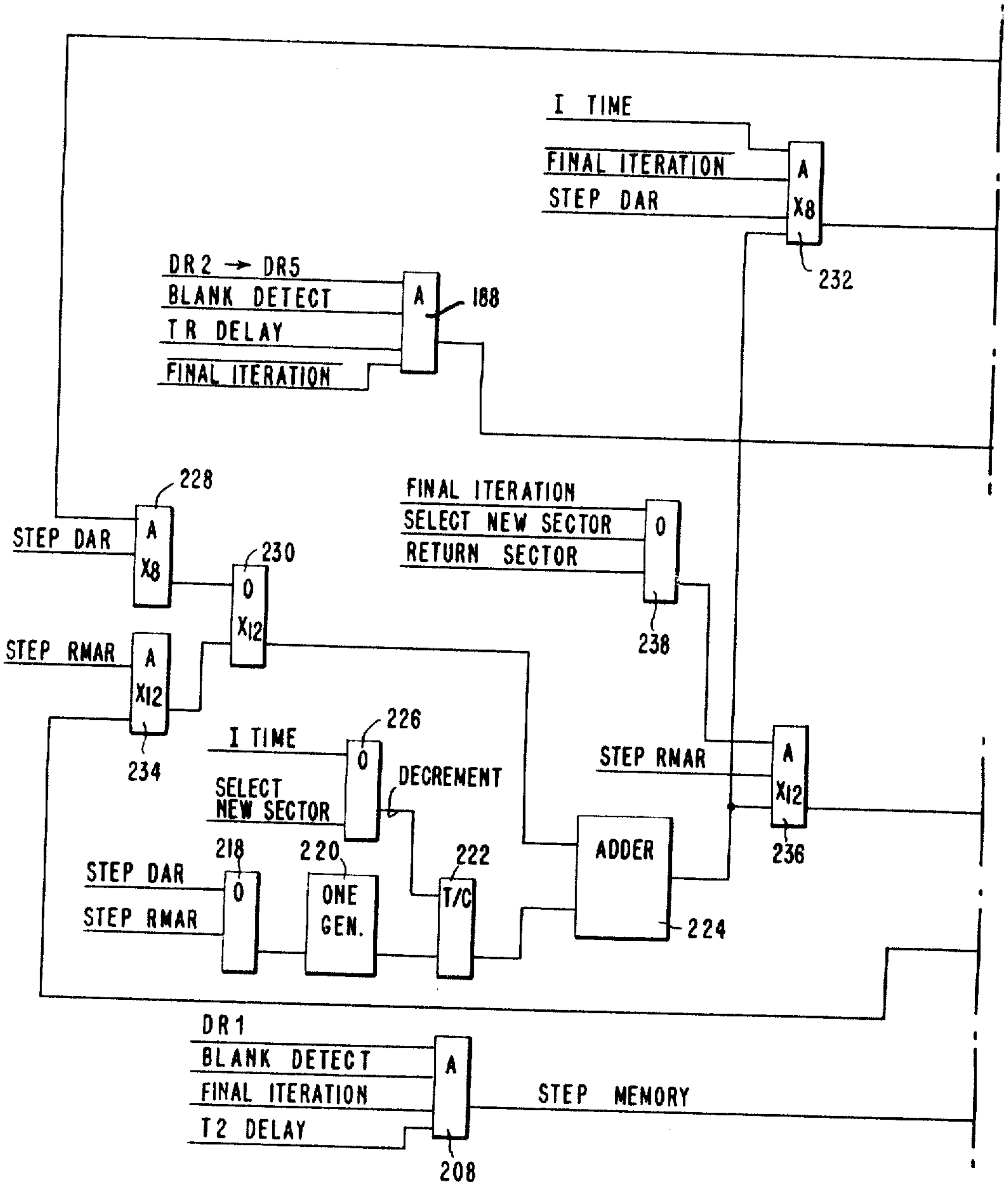
Figure 9:
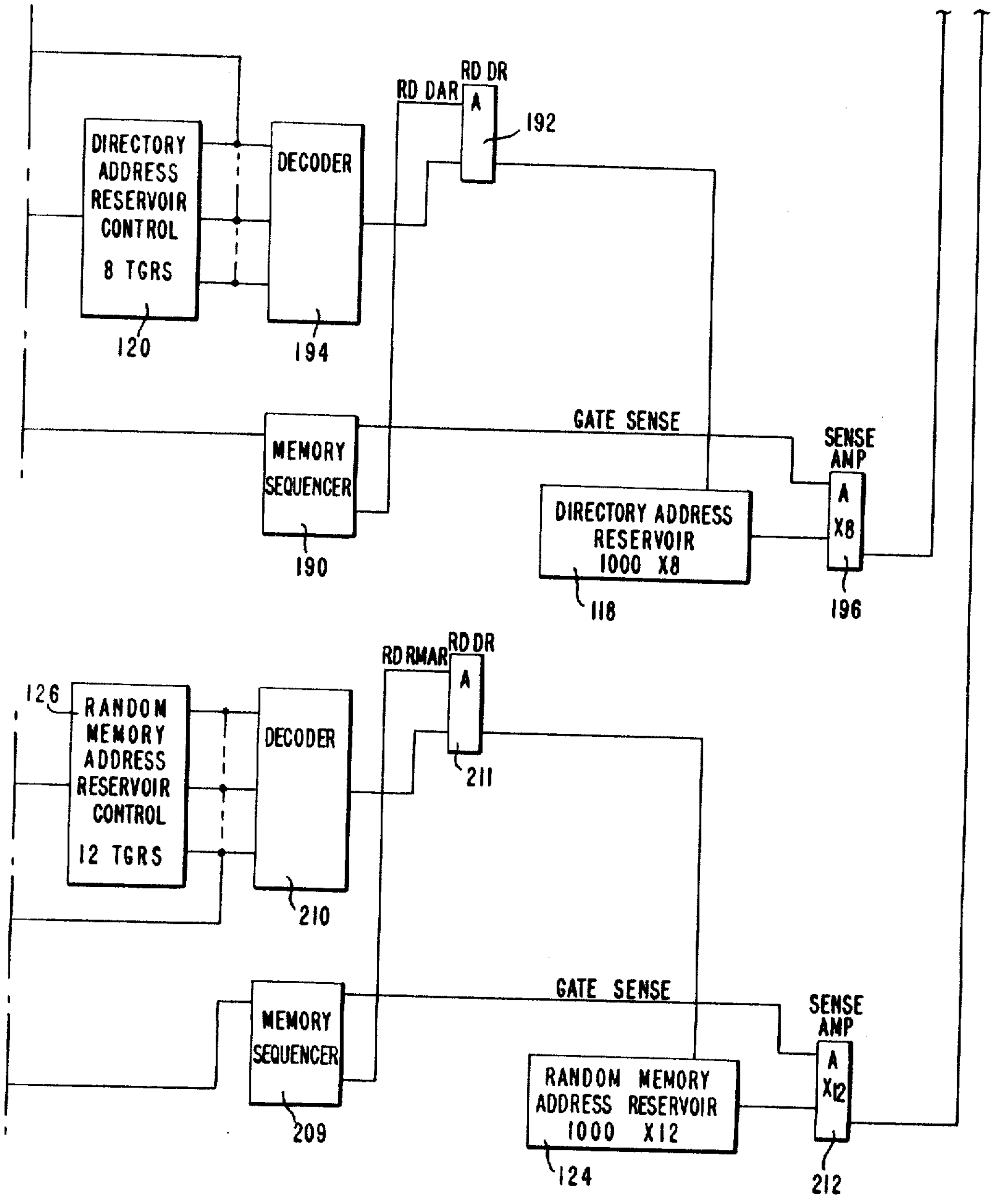
Figure 10:
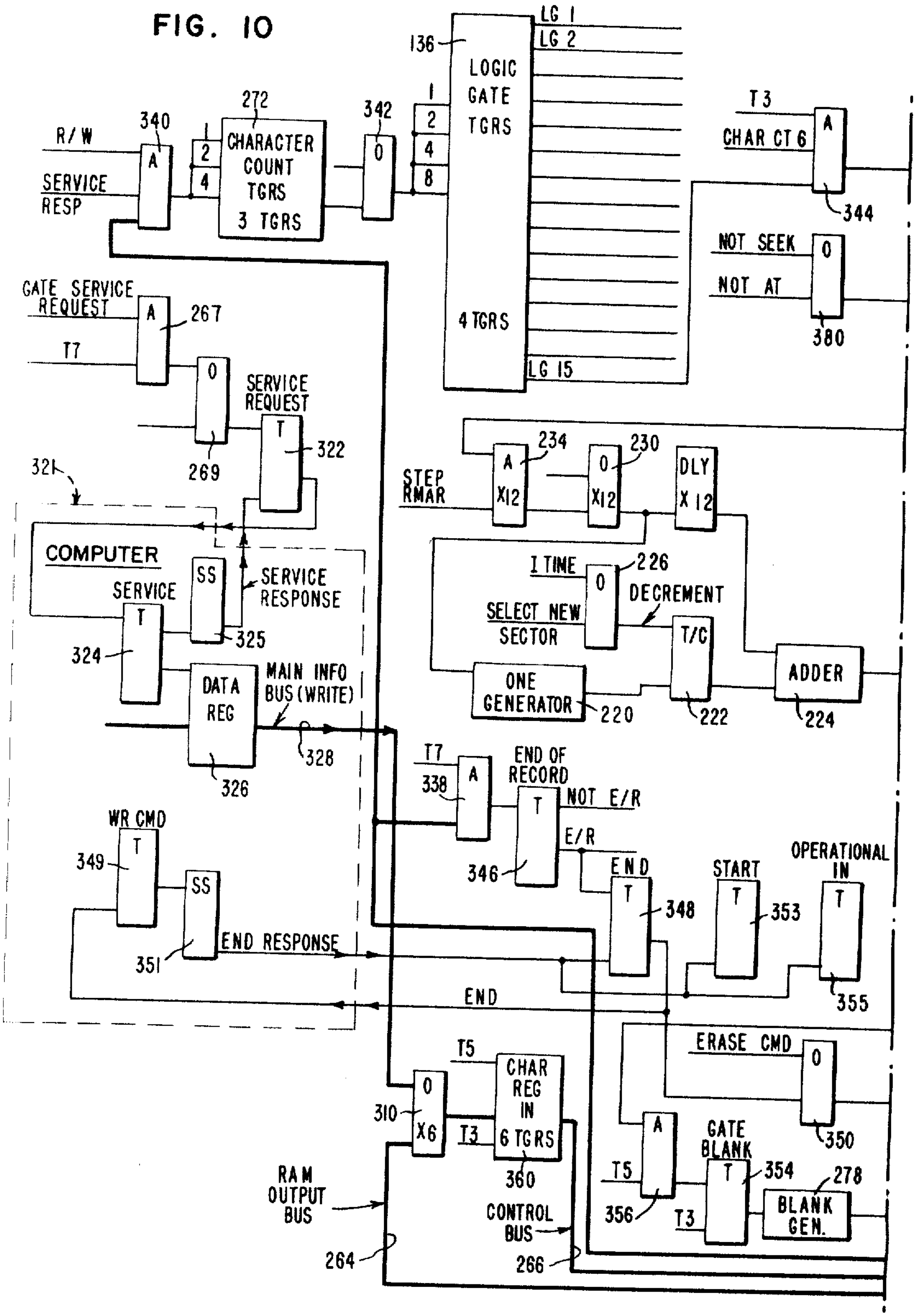
Figure 11:
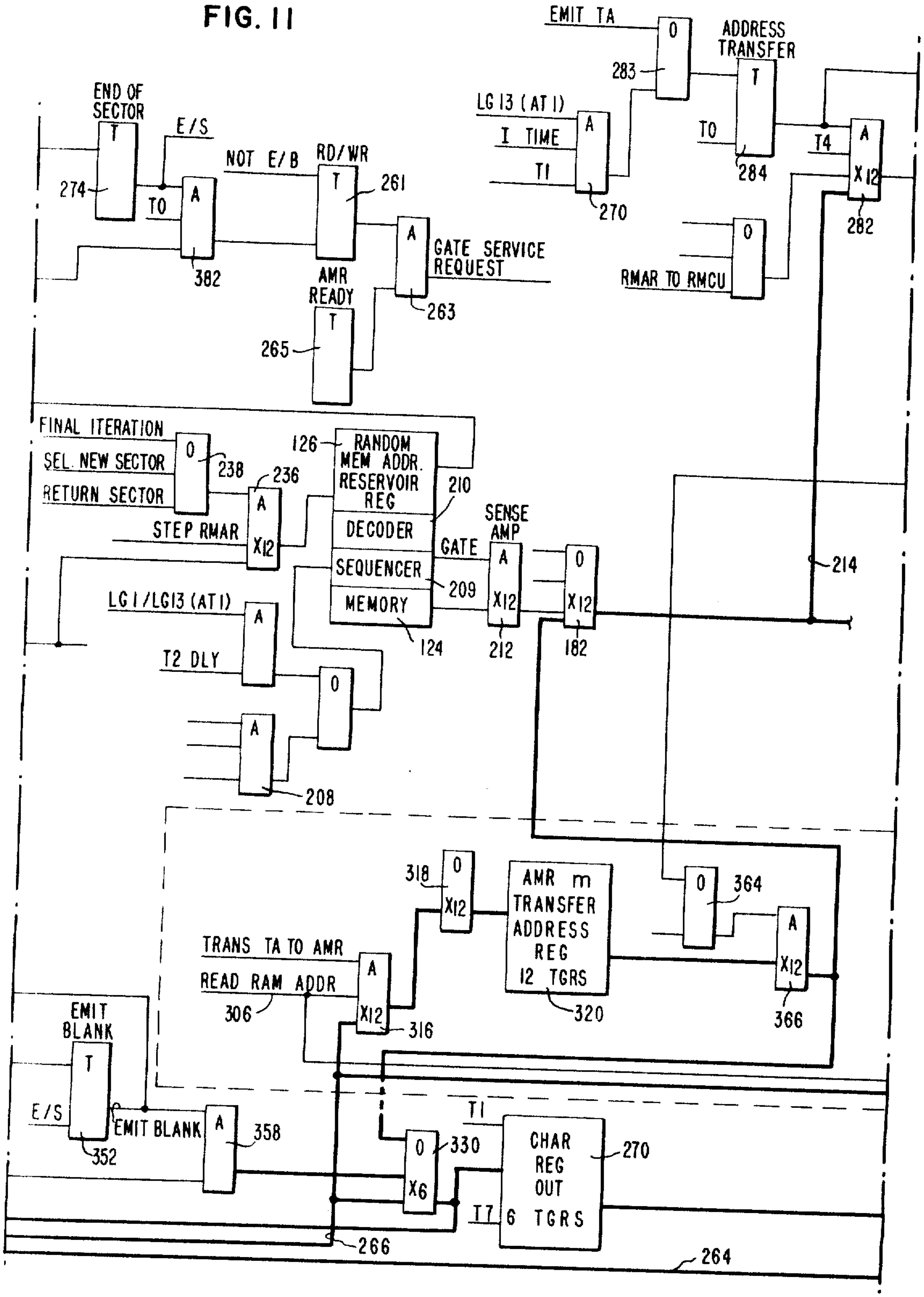
Figure 12:
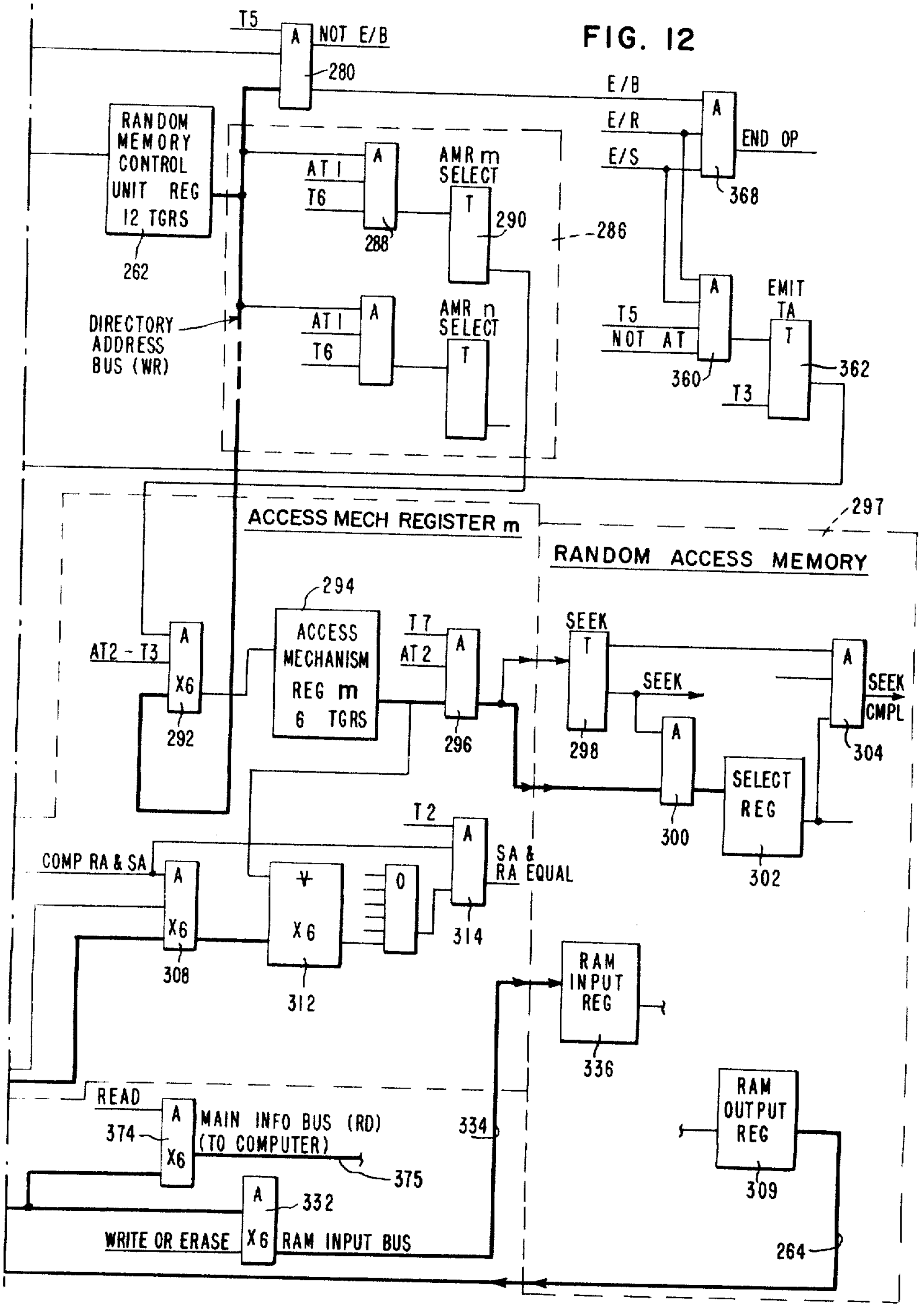
Figure 13:
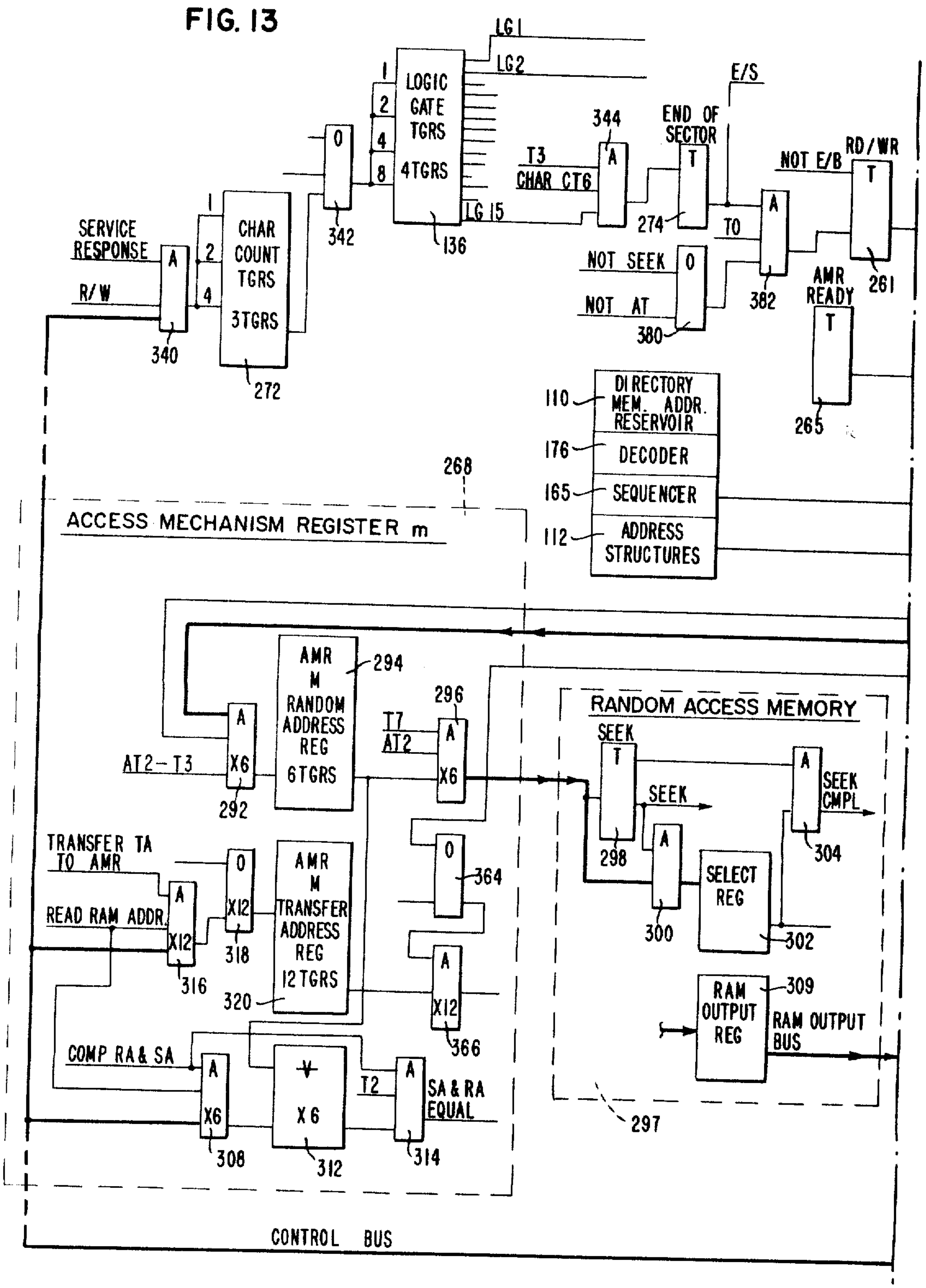
Figure 14:
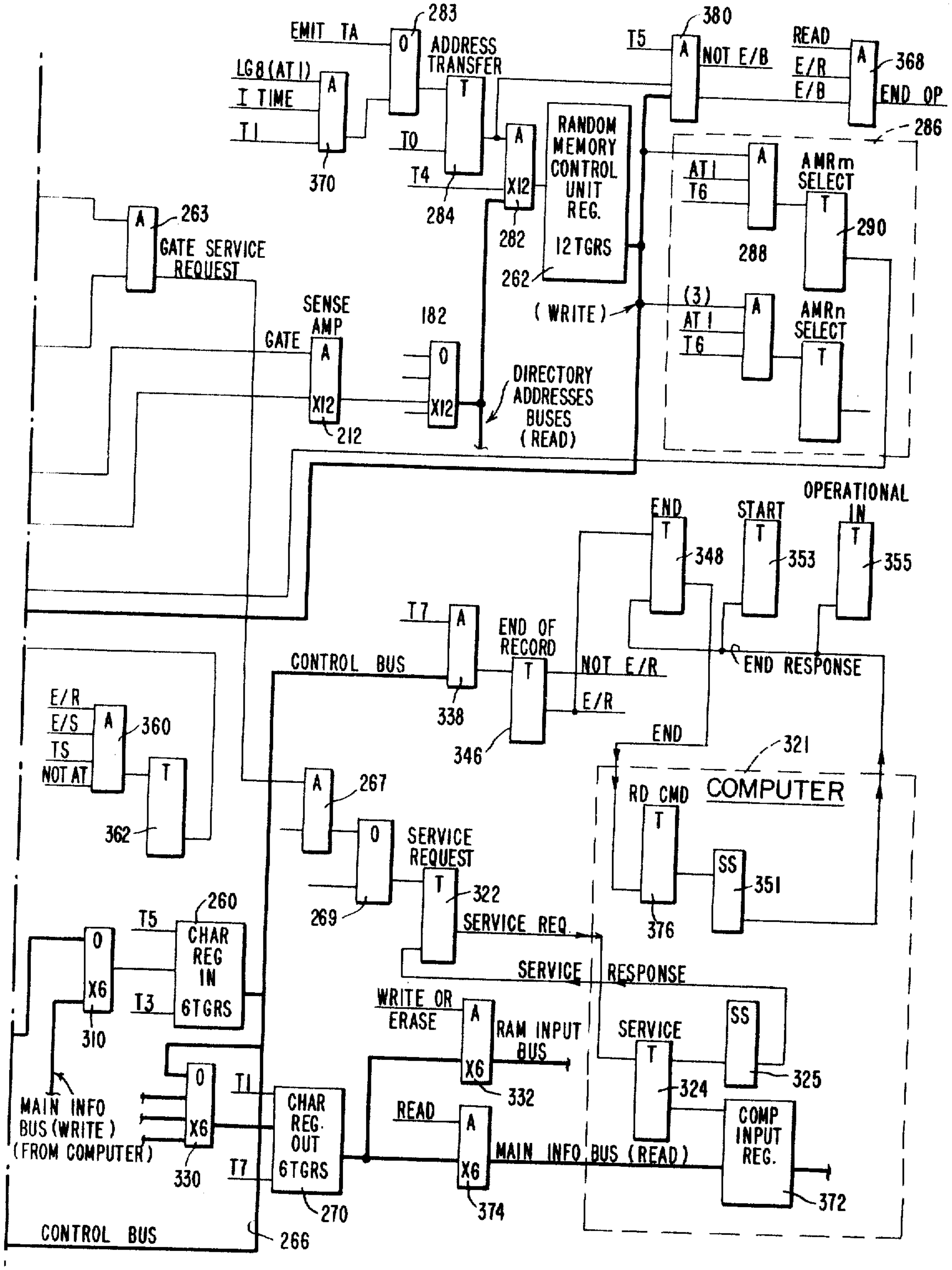
Figure 15:
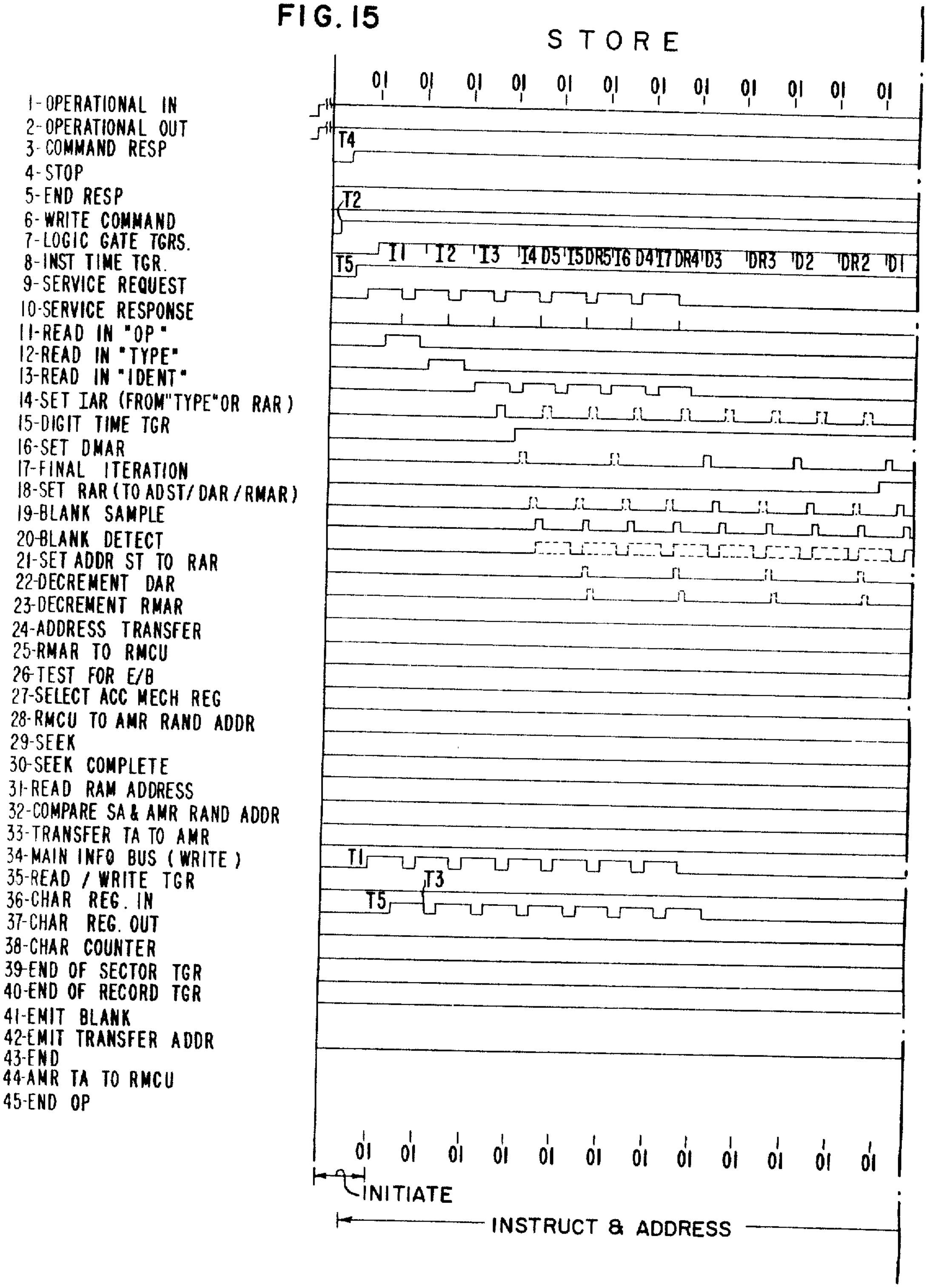
Figure 16:
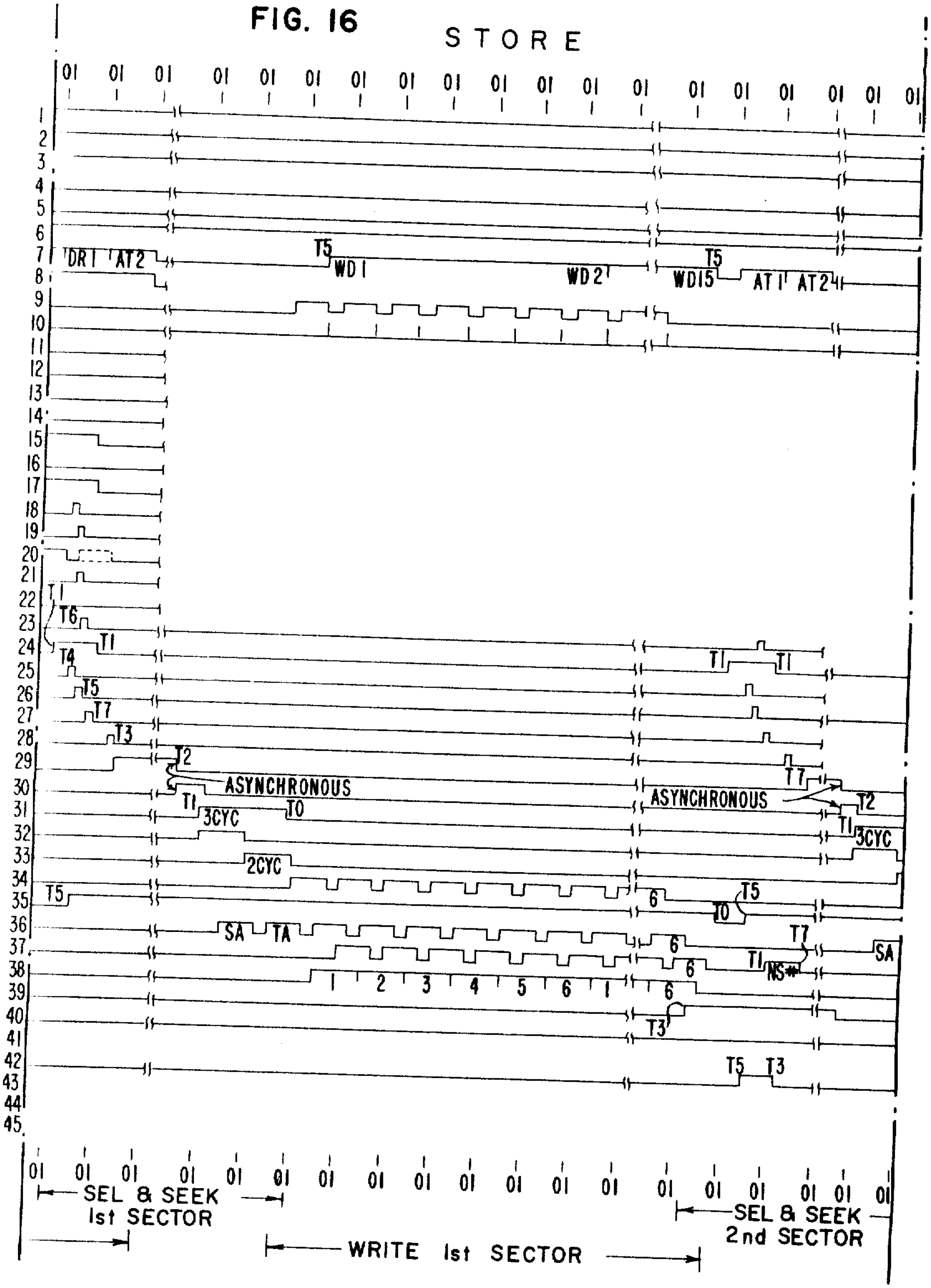
Figure 17:
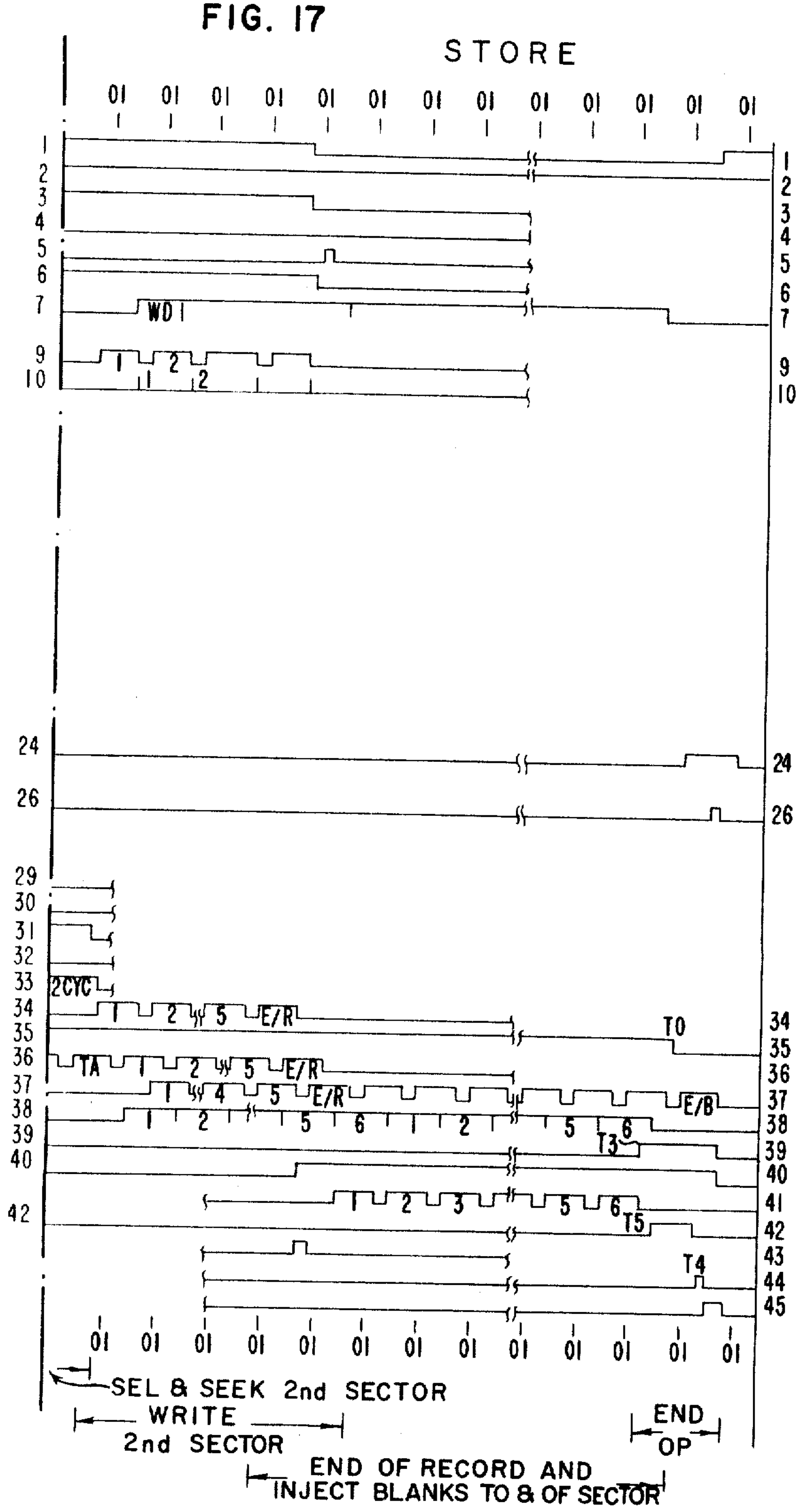
Figure 18:
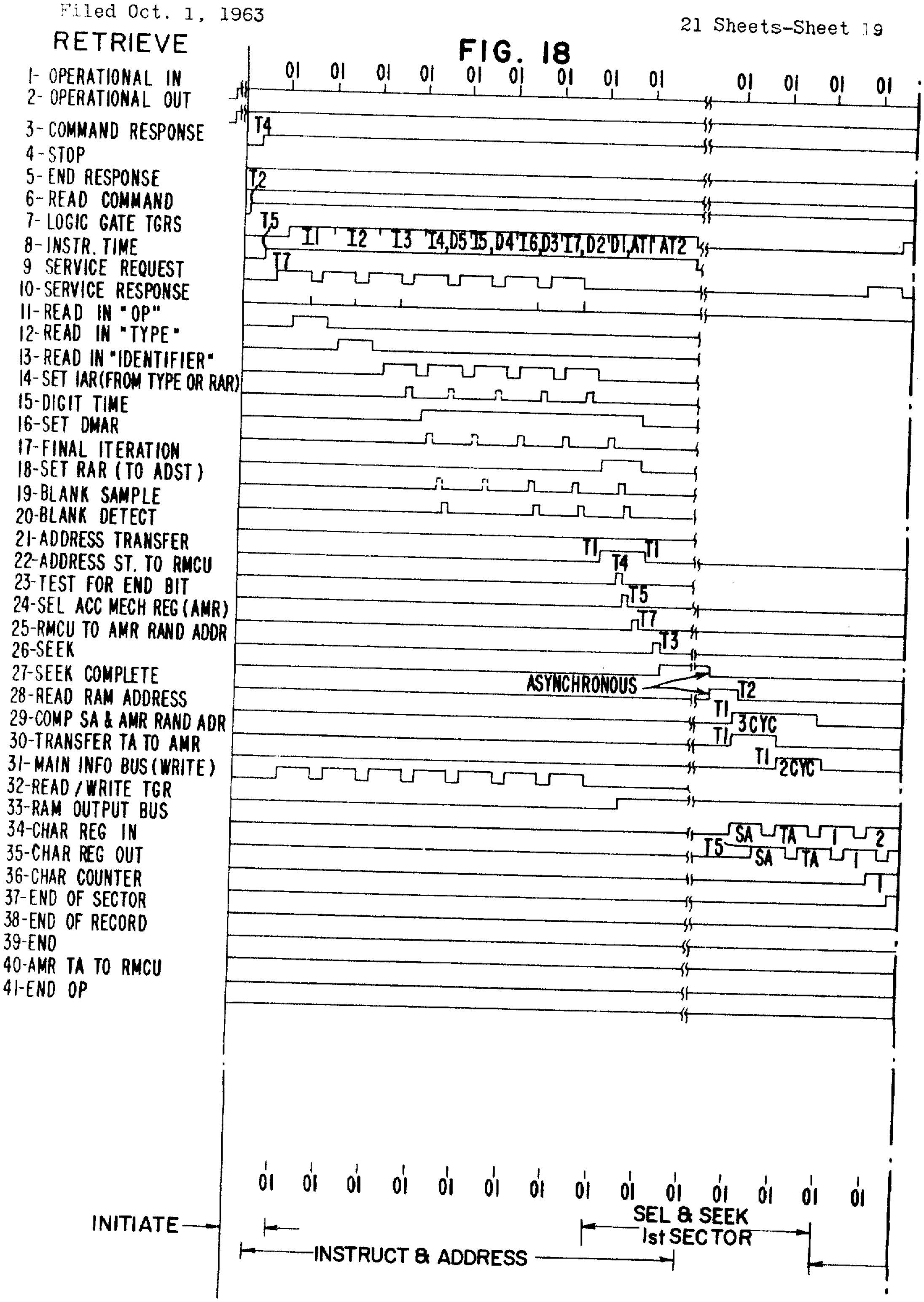
Figure 19:
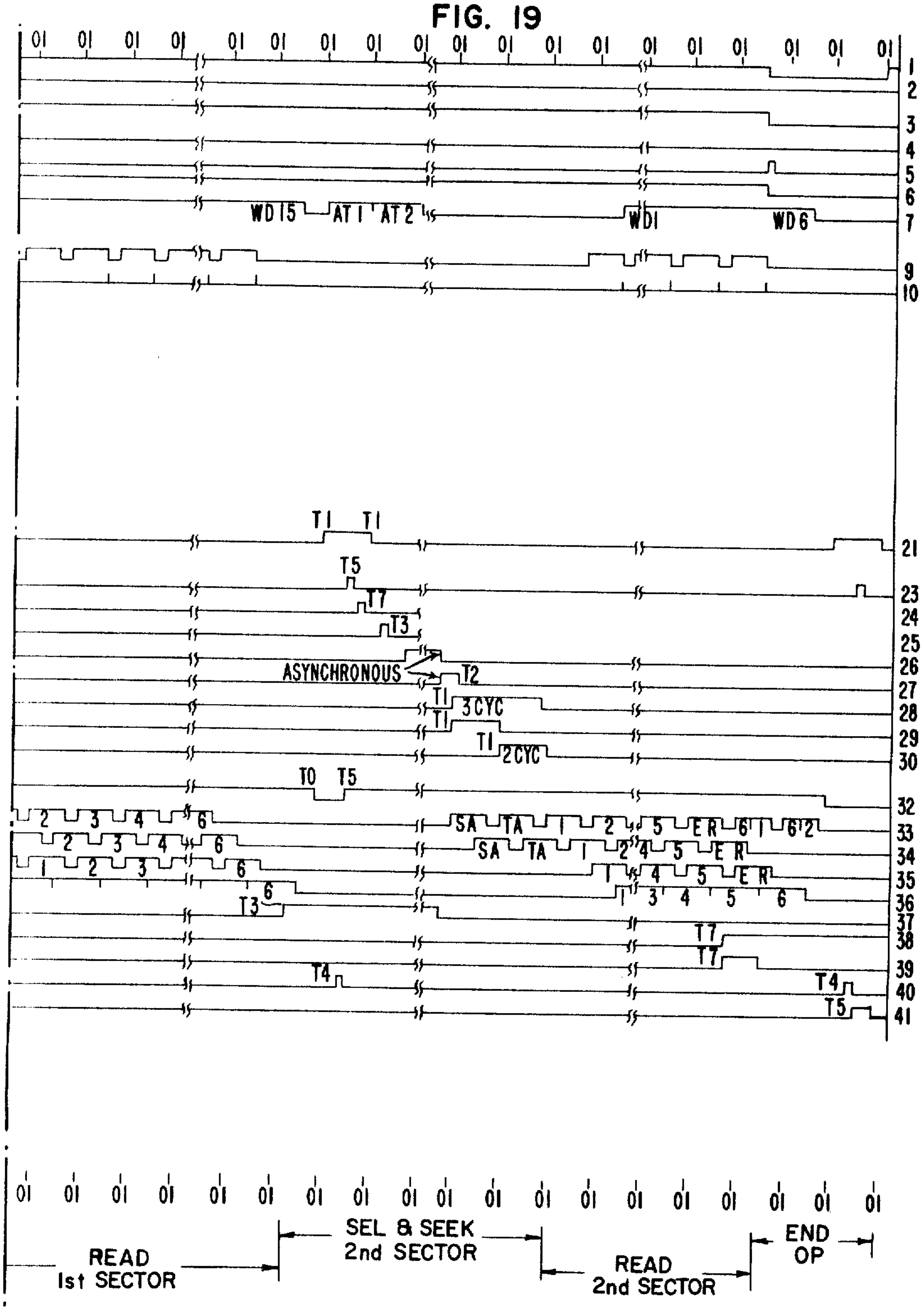
Figure 20:
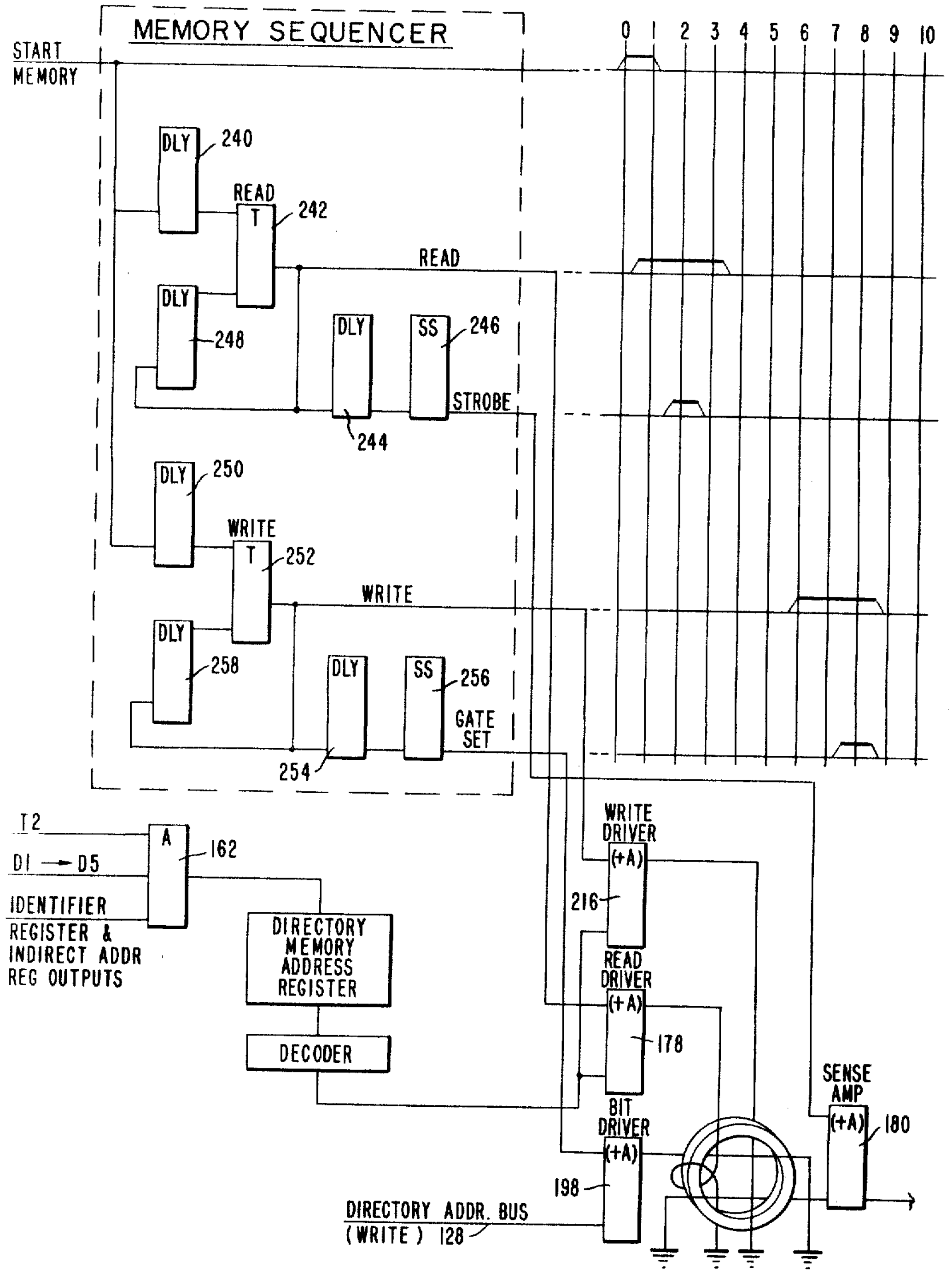

FIGS. 5, 6 and 7, when taken together, comprise a diagram of the address directory control circuits;

FIGS. 8 and 9, when taken together, constitute a diagram of the address directory circuits;

FIGS. 10, 11 and 12, when taken together, comprise a diagram of the data transmission circuits mainly involved during a data storing operation;

FIGS. 13 and 14, when taken together, form a diagram of the data transmission circuits involved mainly during a data retrieval operation;

FIGS. 15, 16 and 17, when taken together, comprise a diagram showing the timing of the various functions of the system during a data storing operation;

FIGS. 18 and 19, when taken together, comprise a diagram showing the timing of the various functions of the system during a data retrieval operation; and FIG. 20 is a diagrammatic representation of the memory sequencing circuits.

It should be pointed out at the very outset that in the circuit diagrams of FIGS. 5 through 14, multi-element components made up of a plurality of identical elements which are designed to process a plurality of bits, either in parallel or in series, have in most part, been represented by a single element of the component. The number of elements comprising the component has been indicated on the element block. Thus, in FIG. 6 for example, the AND circuits 142, 144, 146, 148 and 150, are each representative of a character transmission component comprised of four such AND circuits. This fact is indicated by the legend "X4" in the schematic blocks. Each of the AND circuits referred to transmits a single bit of a character while the component made up of four such AND circuits is adapted to transmit an entire character composed of four bits.

*Overall memory organization and operation*

Figure 1A:
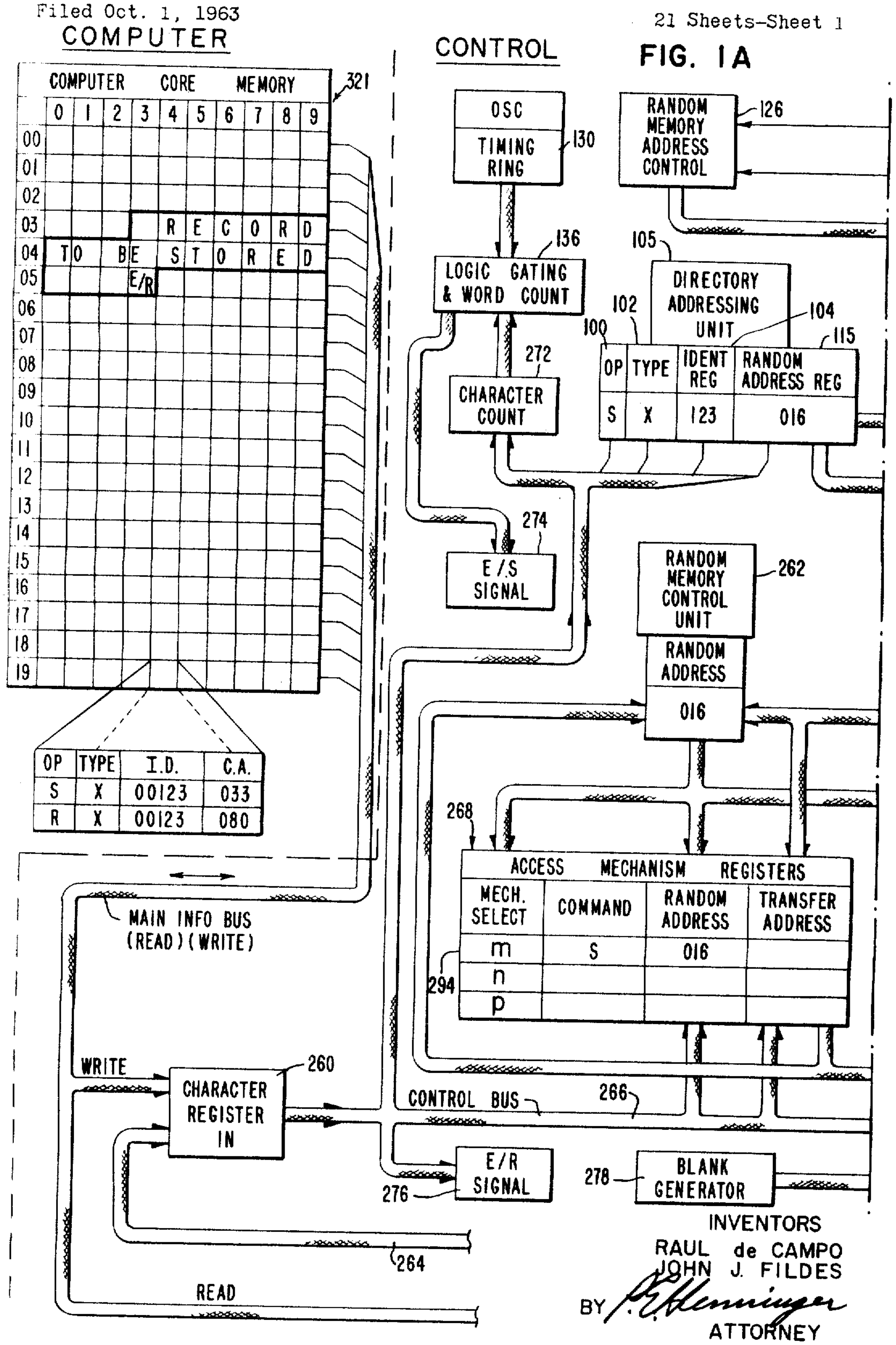
Figure 1B:
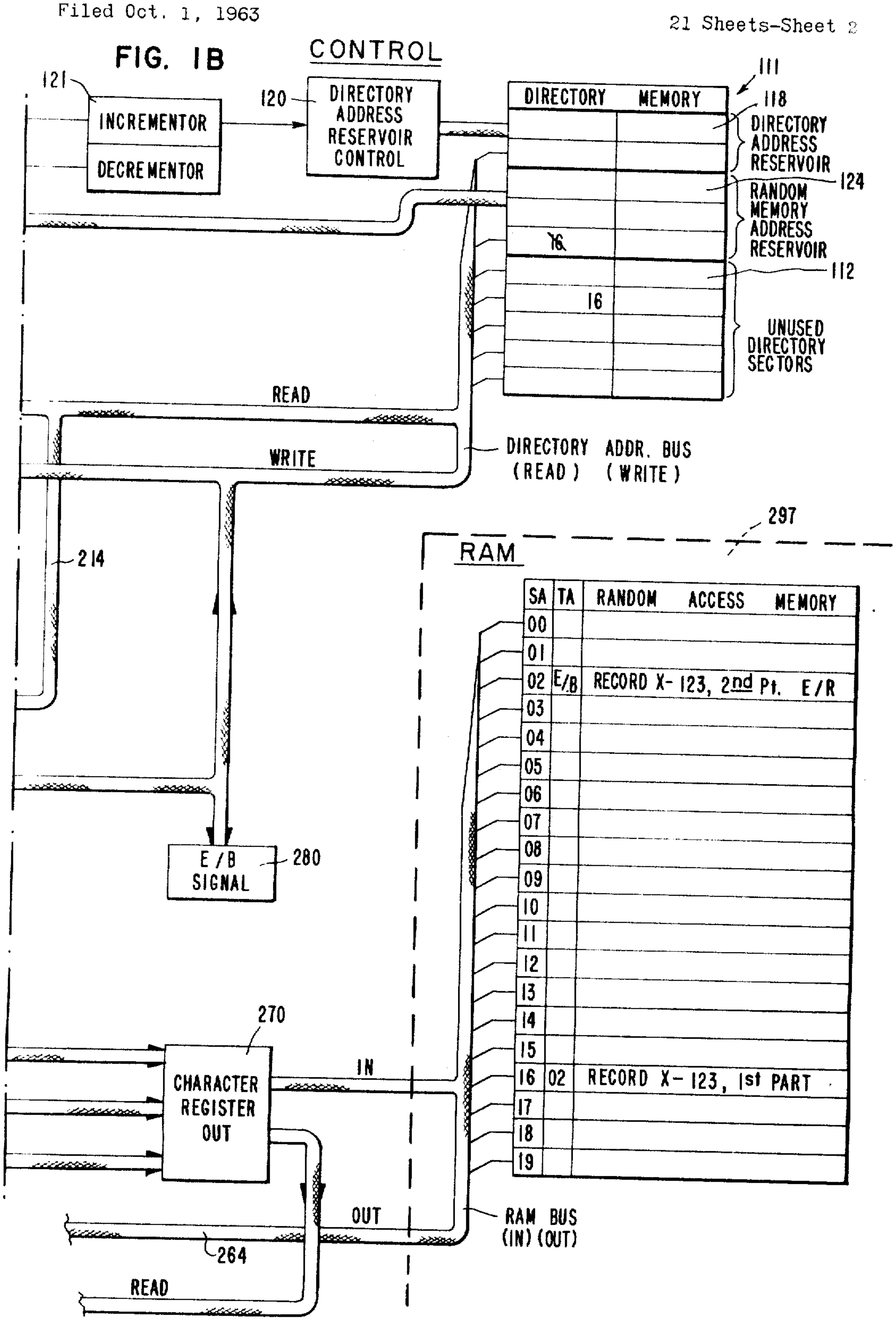

FIGS. 1A and 1B, when taken together, constitute an overall block diagram of the memory addressing system. At the left is represented a computer memory 321 which may be of any suitable type such as a core memory. Data to be stored in the random access memory will be derived from the computer memory. Retrieved data will be taken from a random access memory 297 in FIG. 1B and will be put into the computer memory 321. The random access memory in FIG. 1B has associated therewith a directory memory 111. The directory memory is composed of structured and unused directory sectors 112, a directory address reservoir 118, and a random memory address reservoir 124. The random access memory 297 is visualized as a large capacity storage memory composed of magnetic disks, magnetic drums, magnetic tape strips, magnetic cores, or the like; while the directory memory 111, being of relatively small capacity, may be a core memory.

The directory memory 111 is associated with a directory address reservoir control unit 120 and with a random memory address control unit 126. The random access memory 297 is associated with a random memory control unit 262 and with access mechanism registers 268. Interconnecting these several units are the directory address read and write buses and the main information read and write buses. The nature and function of these principal units, together with their associated units, will be explained more fully in the detailed circuit description that is to follow.

Reference herein to a random access memory is solely for the purpose of specific illustration. The important attribute of the memory is that it be addressable. That it is also of a random access type is of no particular importance.

The system is well adapted to perform three basic operations: namely, store, retrieve and erase. For the purpose of this disclosure, and serving to teach the invention fully, it will be sufficient to confine the discussion to the store and retrieve operations. It should be obvious to one skilled in the art that the generation of addresses for a large number of identification numbers, over a significant period of time, will saturate the storage capacity of the system. Of course, the larger the system storage capacity, the greater the number of addresses which may be generated before saturation of storage occurs. However, after some period of time, certain stored data, whether addresses, indirect addresses, or elements of the customer's records may be of no further use. It would save storage space, and thereby avoid saturation thereof, if those portions of storage utilized for such stale intelligence were erased and made ready for use on new identification numbers. Since the particular storage apparatus to be used in a given embodiment of this invention is not critical, a suitable erasure system may be selected from a great variety thereof known to the art. Similarly, the particular method of clearing out unwanted storage values may be selected in order to best suit the particular storage apparatus used.

To control the store and retrieve operations, certain distinct signals are required. An END OF SECTOR (E/S) signal is generated in a word counter 136 associated with each of the access registers in the access mechanism registers 268. This signal stops data transmission if the tranmission has not already been stopped by reason of some other condition. Further operation is determined by the presence or absence of END OF RECORD (E/R) and END BIT (E/B) signals. The length of every record is defined by an end of record mark E/R. When an end of record mark is sensed, transmission of data is halted. An end of bit is recorded in a transfer address position of any sectors assigned for storage in the random access memory. Sensing the end of bit terminates all read operations. However, during store operations, if an end bit is signalled before the end of record mark is sensed, a new sector in random memory is assigned and the storing operation is continued.

Each instruction goes through a directory phase and a random memory phase. In the directory phase, the customer's data identification is equated with a random memory address. In the random memory phase, data is actually stored or retrieved, according to the operation code. If the record being processed is long enough to require several blocks in storage, the random memory phase will consist of several sub-phases, one for each block. The emphasis herein will be on the directory operations.

Before delving more deeply into the organization and operation of the system, a word should be said concerning memory addressing and assignment by which the control of the random access memory can be understood.

Figure 2:
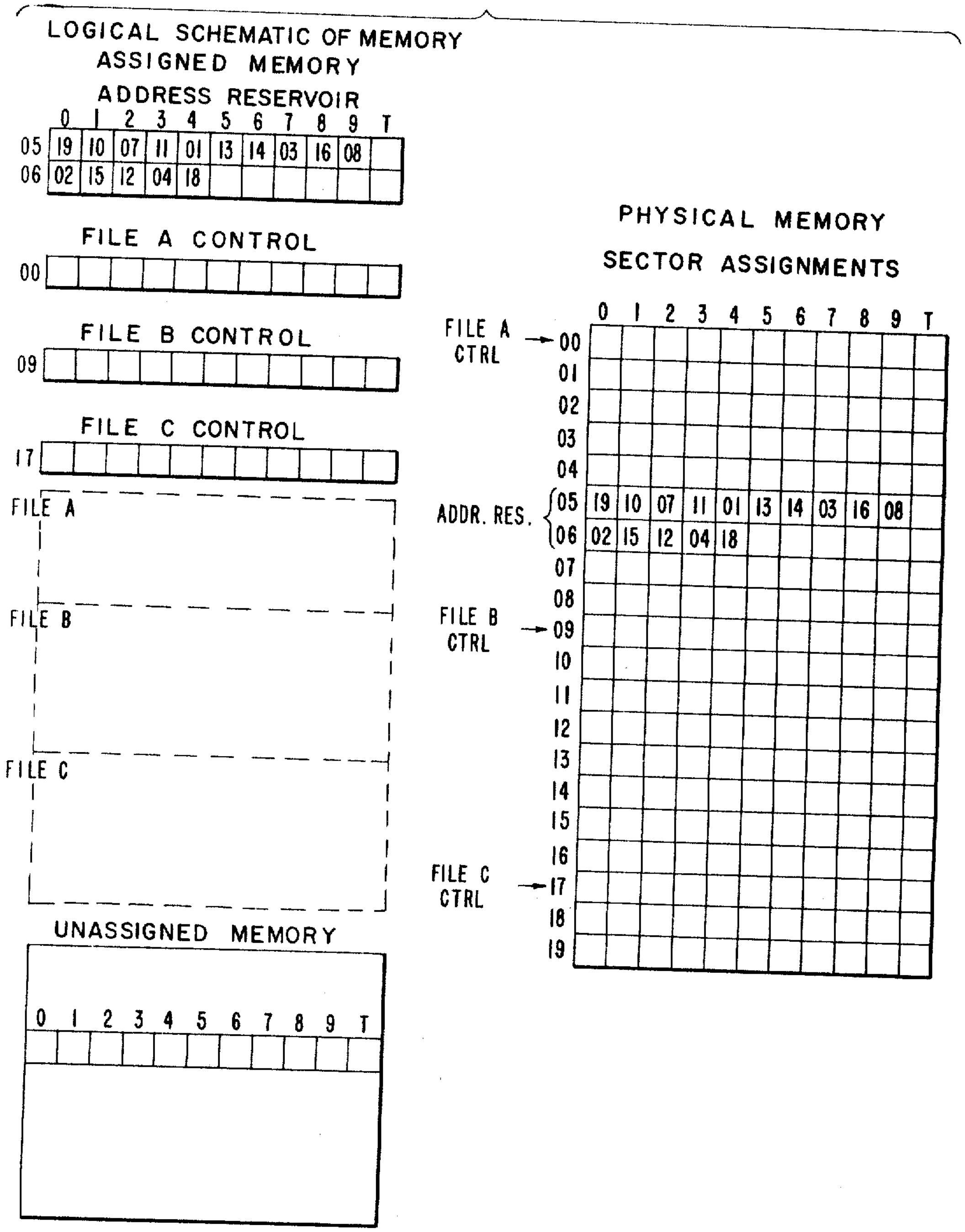
FIG. 2 is a schematic representation of the directory memory, showing at the right the physical format of the memory and at the left a logical representation thereof.

In the discussion to follow, reference may be made to FIG. 2 which discloses both the physical and a logical schematic representation of the directory memory.

An addressable memory by definition consists of a set of addresses and units of memory associated with each of these addresses which are called sectors. Whether a sector is assigned or unassigned will be determined by manipulating its address. The addresses of all the unassigned sectors constitute an address reservoir. When an address is removed from the address reservoir, its sector becomes assigned. What it becomes assigned to is determined by where its address is placed. For purpose of illustration, consideration of the operation of memory control in a 20-sector directory memory will suffice. The initial condition of the memory is shown in FIG. 2. As stated above, FIG. 2 provides both a physical representation of the memory which is at the right of the figure, and also a logical schematic representation of memory which is at the left of the figure. The physical representation of memory shows its actual state and what actually happens during its use; it does not, however, clearly show the significance of what has happened. The logical representation shows the significance of what has happened but does not show what actually has happened. By viewing both these representations together and by comparing them, a more complete understanding can be obtained.

In the initial state of memory shown, five of the twenty sectors have been permanently assigned for special functions. These sectors may be any of the sectors throughout the memory and to illustrate this fact, the five sectors have been arranged at random. In the illustration, sectors 05 and 06 have been reserved for the address reservoir. The other three have been reserved as file control sectors, i.e., file A control at sector 00, file B control at sector 09, and file C control at sector 17. The file sectors are used to assign and position sectors for storing records in each of the respective files. The address reservoir is used to hold the addresses of all the unassigned sectors. These addresses can be in any order and, therefore, are shown at random in the address reservoir of sectors 05 and 06.

A glance at the initial state of the physical memory shows that it is composed of twenty physically consecutive sectors numbered from 00 to 19. Each sector consists of ten data words numbered 0 to 9, and one transfer word labelled "T." This much of the physical memory will never change. As shown at the right in FIG. 2, the entire memory is empty of data except for the two sectors assigned to the address reservoir. These sectors contain the addresses of the fifteen unassigned sectors. It is also apparent that there is no difference between the three sectors assigned for file control and any of the unassigned sectors, except that the addresses of the unassigned sectors appear in the address reservoir, but the addresses of the control sectors and address reservoir do not.

A comparison of the foregoing with the logical schematic representation at the left of FIG. 2 shows significant differences. First of all, instead of the memory being a continuous block of twenty sectors, it is broken into five separate blocks. The fifteen unassigned sectors form one continuous block of memory, schematically represented by the large square at the lower left of the figure. The five assigned sectors form four separate blocks whereof one block is the address reservoir formed of the two sectors assigned to it, and the other three blocks are the file control sectors 00, 09 and 17. Furthermore, each of the file control sectors schematically gives rise to a file area associated with it. At present these file areas (namely, file A, file B and file C) are empty, since no sectors have as yet been assigned to store data in any of the files.

A sector is assigned by transferring the first available address in the address reservoir to the file control register. Sector number 18 of the address reservoir, being transferred to the first word position in the file A control sector, is now reserved to store a record in file A. Schematically, the effect is the same as if sector 18 were removed from the block of unassigned memory sectors at the left in FIG. 2, and were transferred into the file A area at the left.

In a similar manner, two sectors may be assigned to each of the file B and file C areas. Physically, all that happens is that the next two available addresses are removed from the address reservoir and are put into the control sectors for file B and file C, respectively. Schematically, four sectors are removed from the unassigned block and two of them are put into the file B area, while the remaining two are put into the file C area. It should be stated that memory sectors are not assigned to the file area until they are to be used. It is, in fact, the presence of a record to be stored which causes the sector to be assigned.

If a record being stored is too large to fit into a sector assigned for it, a second sector will be assigned and chained to the first sector assigned to the record. Thus, the record will be stored in two or more sectors, as may be required. Assume that sector 18 was originally assigned to file C for the receipt of a record, and that the sector is not large enough to receive the complete record. Under such circumstances, the next available address, i.e. 04, will be taken from the address reservoir and will be assigned to sector C. Instead of placing the new address in the control sector, it is put into the transfer word portion of sector 18. In effect, this links sectors 18 and 04, thereby providing twenty data words to store the file C record instead of the original ten words.

At this point it is appropriate to return to the discussion of overall memory structure and operation which was interrupted for the purpose of considering the memory format. It should be first noted that each instruction received from the computer consists of four fields. This is represented at the bottom left of FIG. 1A. These fields comprise an operation code which indicates whether the operation to be performed is one of storing or retrieving. A type identifier comprises the second field and this in its simplest application corresponds to a file identification. For example, it indicates whether the instruction is concerned with an inventory record, or a personnel record, etc. The third field is the identifier which is a series of characters selected by the customer and assigned by him as an identification of his data. For example, it may refer to a part number, a man number, etc. It should also be pointed out that in this system, the same type identifier is always applied to data of the same class. Finally, the fourth field of the instruction contains the initial address of the area in the computer from which data is to be stored or into which it is placed.

By way of further example, it should be noted that the instruction at the bottom of FIG. 1A indicates by the presence of a "S" that the operation to be performed is a store operation, i.e. the transfer of data from the computer core memory 321 to the random access memory 297. The type of operation represented by the "X" may, for example, involve an inventory operation. The identifier code indicated by 00123 may be a part number, and the digits 033 show that the record to be stored begins at address 033 of the computer core memory. The end of record mark E/R at address 053 of the core memory marks the end of the record. The instruction word is located at address 194 of the core memory.

The manner in which the instruction is executed can be briefly described as follows: The instruction is sent to a directory addressing unit 105 where the operation code is set into a register 100. The type character is set into a register 102 and the identifier is set into a register 104. At this point, the directory circuits of FIG. 3 execute their routine to structure the necessary addresses which will determine the location in the random access memory at which the record is to be stored. The directory operations begin with the receipt of an instruction containing a customer's data identification, and it ends when the data storage address has been put in the instruction, and the instruction is sent to the random memory control unit.

Figure 3:
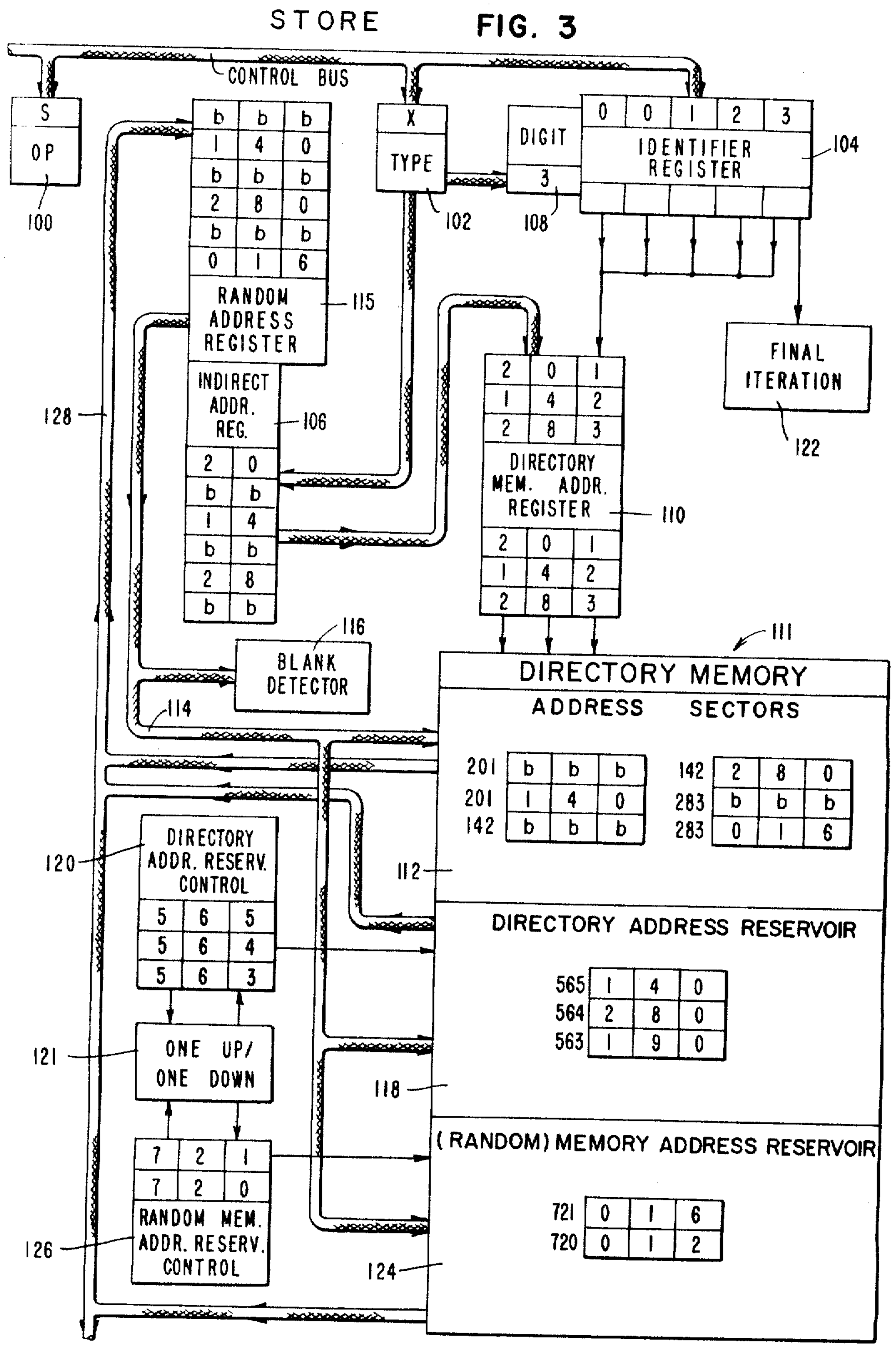
FIG. 3 is a schematic representation of address manipulation during a data storing operation.

FIG. 3 schematically illustrates the organization of the directory units. The directory operations perform augmented indirect addressing which is a method by which successive parts of an identifier are combined with a succession of partial indirect addresses to form new addresses and eventually a desired address. Augmented indirect addressing, as explained, is a reiterative technique for generating and locating addresses. The number of iterations required depends on the number of characters in the identifier, or a selected part thereof. There will be one iteration for each character. When the last character of the identifier has been used, the address located with it will be the address of the desired memory location where the data is stored or from which it is to be retrieved. Each iteration takes a partial indirect address and combines it with a character from the identifier to form a new address. This new address is either the address of the location of the next partial indirect address to be used in the next iteration, or if the last identifier character has been used, it is the address of the desired memory address.

FIG. 3 schematically illustrates the organization of the directory. The main information bus is connected to the directory instruction registers previously referred to; these being the OP register 100, a random address register 115, the type register 102, and the identifier register 104. The directory memory is functionally divided into three parts as described above, i.e., the address sectors 112, the directory address reservoir 118 and the random memory address reservoir 124. Each of the address reservoirs has a control unit associated with it. The directory address bus interconnects the different parts of the memory with the random address register.

FIG. 3 shows more specifically a number of units which are only generally represented in FIGS. 1A and 1B. These units comprise an indirect address register 106, a directory memory address register 110, a digit control 108, a final iteration circuit 122, a one-up/one-down unit 121, and a blank detector 116.

The indirect address register 106 is actually a sub-division of the random address register 115. It includes all the positions in the random address register except the units position. The indirect address register 106 is connected to all the positions of the directory memory address register 115, except the units position, and is used to address any word in the directory memory 111. The digit control circuits 108 comprise a device for determining which digit of the identifier register 104 will be read out into the units position of the directory memory address register 110.

The final iteration unit 122 operates whenever the units position of the identifier register 104 is read out and thereby signals that the final iteration will occur. The one-up/one-down unit 121 is a device for incrementing or decrementing the addresses in the address reservoir control units 120 and 126. The blank detector 116 emits a signal when a blank address is transmitted to the random address register 115.

The manner in which these units operate to structure an address for the storage of data in the random access memory will be described in a general way with respect to FIG. 3. At a later point in the specification, these circuits will be dealt with in detail.

*General description of address structuring operation during data storage*

The directory control circuits may be instructed to transfer a record from a specific computer core memory location to an available block of the random access memory. This instruction will include the store operation character "S," which is transmitted to the operation circuits 100 to indicate that the operation is to be a data storing operation. It will include a type character which is transmitted to the type circuits 102 to indicate the type of file which is involved, and it will also include a plurality of identifier characters directly associated with the customer's record identifier which are stored in the identifier register 104. The instruction in this example, therefore, consists of seven characters. The operation character (S) will be made up of six bits. This will be followed serially by the 6-bit type character and then by the characters comprising the identifier which are entered into the identifier register 104 beginning with the high order and descending to the low order.

The operation of structuring the directory sectors will begin as soon as enough information is in the several registers to initiate the first iteration. The first address to be established for the directory memory address register 110 will be derived from two portions of the type character in the register 102. Four bits of the type character will be employed to establish the tens order of the indirect address register 106. The indirect address register units order will always be zero in creating the initial partial address (these orders correspond to the hundreds and tens order, respectively, of the directory memory address register 110). The indirect address register 106 will, therefore, supply the hundreds and tens portion of the directory memory address in the directory memory address register 110. The units order of the directory memory address will be supplied from an identifier character in the identifier register 104. Which of these digits, beginning with the highest order, to be taken from the identifier register 104 is established in the digit translator 108 by the two remaining bits of the type character in the register 102.

The digit 3 in the digit translator 108 signifies that the first position of the identifier character in the identifier register 104 is to be the hundreds order. The indirect address register 106 and the hundreds position of the identifier register 104 are read out and stored in the directory memory address register 110, such that the digits 201, for example are now present in the latter register. The digit control circuit 108 is now decremented by one position thereby setting the identifier register 104 to next read out its tens position. The directory memory address register 110 causes the word at sector 201 of the directory memory 111 to be read and stored in the random address register 115. However, since this is the first time a record is being stored, the word at 201 of the directory memory 111 is blank and the blank detector 116 signals this fact with the result that blanks (*bbb*) are, in effect, shown in the random address register 115.

Since the word at 201 is blank and since the system is in a store operation, the next available address is read from the directory address reservoir 118 which stands at word 565, and the sector address (140) found at word 565 of the directory address reservoir 118 is stored in the random address register 115, and during the write portion of this memory cycle it is also stored at 201 in the address sectors 112. The address in the control unit 120 is now decremented by one, thereby making 564 the address of the next directory sector address available for assignment from the directory address reservoir 118. This time the blank detector 116 signals "not blank." It should be noted that the words stored in the directory address reservoir are at times referred to as "intermediate" addresses since they, in conjunction with elements of the customer's identifier, are used to derive the ultimate address in storage.

The indirect address register 106, which now registers 14 (the first two characters of the word 140 at address 565) and the tens position, i.e., the 2 from the identifier register 104 are read out and stored in the directory memory address register 110. The digit control is incremented by one, setting the identifier register to next read out the units position of the identifier register 104. The directory memory address register 110 causes word 142 of the directory memory 111 to be read out and stored in the random address register 115. Word 142 is blank and is so signalled by the blank detector. Blanks are, in effect, stored in the random address register 115.

The next available directory address (280) is read out of the directory address reservoir 118 at word 564 and set into random address register 115. During the write portion of this memory cycle, it is stored at word 142 of the directory memory 112. The directory address reservoir unit is decremented by one such that it now stands at 563. During this storage operation, the blank detector 116 signals "not blank."

The indirect address register 106 and the units position of the identifier register 104 are read out and stored in the directory memory address register 110, such that the word now standing in the directory memory address register is 283. The digit translator 108 will signal that the final iteration is approaching. The word (*bbb*) at word 283 of the address sectors is read out and stored in the random address register; this word being a blank is so signalled by the blank detector 116 that blanks are, in effect, stored in the random address register 115.

Since word 283 of the address sectors 112 was blank and since the operation is a storing operation, an address must be assigned. However, as this is the final iteration, the address will be taken from the random memory address reservoir 124 rather than from the directory address reservoir 118, as in previous cases. The address (016) at sector 721, at which the random memory address reservoir 124 is standing, is stored in the random address register 115 and during the write portion of the memory cycle it is stored at word 283 of the address sectors 112. The random memory address reservoir control is decremented to 720. The operation character and the random address are read out onto the directory address bus (read) and stored in the random memory control unit 262 (FIG. 1A).

The random memory control unit 262 checks the random address in the instruction for an end bit (E/B). Since there is no end bit, the random memory control unit 262 examines the address and determines which of the available access mechanisms 268 can service the instruction, and the instruction is then routed to the available register of the access mechanism registers 268. The access mechanism registers initiate a seek to the random address called for in the instruction. As soon as the access unit is positioned, the block address and the transfer address position of the block is read. The block address is compared with the random address in the register to insure that the access mechanism is properly positioned and the contents of the block address position are stored in the transfer address portion of the access mechanism registers 268. A signal is sent to the computer memory address register to read out of the core memory 321 the first word of the record to be stored. This word is stored in the first data word of block 016 of the random access memory 297.

It is assumed herein, for purpose of illustration, that each random access memory block can hold fifteen data words. The word counter 136 associated with each access mechanism register 268 will keep count of the words stored to indicate when the block has been filled. Therefore, this counter is initially reset to zero. The contents of the counter are incremented by one each time a word is transmitted and when it reaches fifteen, the end of the block will be signalled. A test is now made to see if the end of the record has also been signalled.

If a test for end of record and end of block is negative in both cases, the storing cycle is repeated until the next fourteen words are read out of the computer memory and stored in the random access memory. It can be assumed that at this time the end of the block will have been reached, since the word counter 136 has been stepped to fifteen. The computer address now stands at 048, the address of the next word to be stored.

During this procedure, all information transferred from the random address register 115 to the directory memory 111 has been done so via a directory address bus (write) 128. The data stored in the random access memory 297 from the computer memory 321 has been, by way of the main information bus, the character register (in), control bus, character register (out) and the random memory address bus (in).

*Storage controls*

The basic timing for this system is established by a free running clock 130 (FIG. 6). This clock consists of three binary triggers driven by an oscillator whose frequency is determined by the computer and RAM requirements of the system. The output of the clock are timing pulses T1 through T7 and T0. The T0 pulse from the clock 130 is directed through an AND circuit 132 whose second input is the signal I TIME derived from a trigger 134. The T0 pulse gated through the AND circuit 132 energizes logic gate triggers 136 which produce logic gate pulses 1 through 15 (LG1–LG15).

The instruction from the computer is fed into the registers 100, 102 and 104 as follows: The first character in the series will be gated into the OP register 100 through AND circuits 138 (FIG. 5) during I time, at logic gate 1, T3 time. The second character in this series will be gated into the type register 102 through AND circuits 140 during I time, at logic gate 2, T3 time. The third character in the series will be gated into the ten thousands order of the identifier register 104 through AND circuits 142. This third character is gated in during I time, logic gate 3, T3 time. The fourth character in the series is gated through AND circuits 144 to the thousands order of the identifier register during I time, at logic gate 4, T3 time. The fifth character in the series is gated through AND circuits 146 to the one hundreds order of the identifier register 104 during I time, at logic gate 5, T3 time. The sixth character in the series is gated through AND circuits 148 to the tens order of the identifier register 104 during I time, at logic gate 6, T3 time. The seventh and final character in the series for this example is gated through AND circuits 150 to the units order of the identifier register 104 during I time, logic gate 7, T3 time.

The type character in the register 102 is now interrogated by a digit translator 108 to determine the units position of the directory memory address. At the same time, other portions of the type character in the register 102 will set the initial partial address into the indirect address register 106. This will be done in the following manner: Two bits of the type character in the register character 102 will be interrogated by three AND circuits 152, 154 and 156 (FIG. 6). If there are two bits, the AND circuit 152 will translate these two bits to cause read out of the ten thousands order of the identifier register 104 to the units order of the directory memory address register 110 first. If there is only one bit, the AND circuit 154 will interpret this condition to direct the read out of the thousands order of the identifier register first to the directory memory address register. If there are no bits present, the AND circuit 156 will interpret this to mean that the hundreds order of the identifier register is to be read out to the memory address register initially.

Specifically, the translation in the read out operation is performed as follows: If the AND circuit 152 is energized, its output will be routed to AND circuit 158 (FIG. 7). The logic gate 4 pulse will gate the ten thousands order of the identifier register through AND circuits 158, through OR circuits 160 and to AND circuits 162. At T2 time, the AND circuits 162 will transmit the pulse to the directory memory address register 110. Had the AND circuit 154 been energized, its pulse would have proceeded through an OR circuit 164 and through AND circuits 166 at logic gate 6 time. In this case, the thousands order of the identifier register 104 would have been read through the AND circuits 166, through the OR circuits 160, and through the AND circuits 162 at T2 time to the directory memory address register 110. In the case of the assumed example, the AND circuit 156 will also be energized. The pulse from this AND circuit will be routed through an OR circuit 168 to AND circuits 170. This will gate the hundreds order character of the identifier register 104, through the AND circuits 170 at logic gate 8 time, through the OR circuits 160 and through the AND circuits 162 at T2 time to the directory memory address register 110.

As a result of the foregoing operation, the digit 1 has been transmitted from the one hundredth position of the identifier register 104 to the units position of the directory memory address register 110.

When the output of the AND circuits 162 rise, the output pulse is delayed in a conventional delay circuit 163 and the delayed pulse starts a memory sequencer 165. The memory sequencer, working in conjunction with the decoded output of the directory memory address register 110, will select the proper read driver AND circuits 178 to read out the selected partial or sector address through sense amplifier AND circuits 180, OR circuits 182 onto the directory address bus (read) 114, through AND circuits 184 and to the random address register 115.

The other four bits of the type register character 102 are routed through OR circuits 172 and at logic gate 3 time, T6 pulse, these four bits will be gated into the indirect address register 106 to establish the initial indirect address. These bits will be gated through AND circuits 174 (FIG. 6).

For the purpose of the example, the control digits of the indirect address register have been established as 20. At logic gate 8 time, when the identifier register character is brought down to the directory memory address register, the indirect address register 106 is read out at the same time through the AND circuits 162 and into the one hundreds and tens orders of the directory memory address register 110. Therefore, at logic gate 8, T2 time, an address 201 is set up in the directory memory address register 110.

The directory memory address register output will be decoded by a decoder 176 to energize the appropriate read driver AND circuits 178. While only a single write driver AND circuit 178 has been shown, it will be appreciated that one such circuit will be provided for each storage position in the directory memory address system 112. The appropriate read drivers are energized to read out address structure 201 through the sense amplifier AND circuits 180 and through the OR circuits onto a directory address bus (read) 114. At logical gate 8, T4 time, the contaents on directory address bus (read) 114 will be gated through the AND circuits 184 into the random address register 115. At T5 time of the cycle, the contents of the random address register 115 will be routed through AND circuit 186. The contents of this register being blanks, will energize the blank detect trigger 116. This all takes place during logic gate 8 time.

An examination of the contents of word 201 in the random address register 115, which shows it to be blanks, will turn on the blank detect trigger 116. Now that it has been determined that no address is present in the contents of the particular word stored in the random address register 115, an address will be taken from the directory address reservoir 118. This will be done as follows: During logic gate 9 time, a directory address reservoir memory cycle will be called for since the conditions at an AND circuit 188 (FIG. 8) have been satisfied. These conditions are "blank detect" and "T2 delay time." The output of the AND circuit 188 will cause a memory sequencer 190 to energize appropriate read driver AND circuit 192 (FIG. 9).

The specific nature of the memory sequencer 190 will be explained in detail hereinbelow. It is sufficient to say at this time that it produces certain output signals by which the directory memories are read out.

The other leg of the AND circuit 192 is energized by the directory address reservoir register 120 whose contents are decoded by a decoder 194. This decoder translates the twelve outputs of the directory address reservoir register 120 by means of AND and OR circuitry to select the proper write drivers for reading out the directory address reservoir. The twelve lines of core information will be routed through directory address reservoir memory sense amplifiers 196 (FIG. 9). This information will be routed through the OR circuits 182 (FIG. 7) to the directory address bus (read) 114 and through the AND circuits 184 at T4 time, to the random address register 115. The address read from the directory address reservoir word 565, and which is transmitted to the random address register 115 in the example under consideration, is 140.

In the same memory cycle, the contents of the random address register 115 (FIG. 5) will be set into directory address word 201. This random address is transferred along the directory address bus (write) 128 and through bit drivers 198 (FIG. 7) and into the directory memory 112. At T6 time of the same cycle, the contents of the random address register 115 are routed through the OR circuits 172, the AND circuits 174 and into the indirect address register 106. This places the digits 1 and 4, respectively, into the one hundreds and the tens positions of the indirect address register 106. It should be noted that prior to transfer of the first two digits into the indirect address register 106, the digits were checked for blanks in the blank diector 116. The presence of significant digits is detected on this cycle.

At this junction, the system is ready to perform the second iteration. In other words, the second address is now about to be located and transmitted to the directory memory address register 110. This operation will take place during logic gate 10 time. At logic gate 10, the character in the tens order of the identifier register will be gated through AND circuits 200 (FIG. 7), through the OR circuits 160, through the AND circuits 162, at T2 time, and into the uints order of the directory memory address register 110 (FIG. 6). At the same time, the contents of the indirect address register 106 will be gated through the AND circuits 162 to the hundreds and tens orders of the directory memory address register, such that the address 142 is now in the directory memory address register 110.

The contents of the directory memory address register 110 will again be decoded in the decoder 176 which will gate the pulse through the appropriate read driver AND circuit 178 to gate out the contents of address 142 through the sense amplifier AND circuits 180, through the OR circuits 182 (FIG. 7) and onto the directory address bus (read) 114. The pulse is transmitted through the AND circuits 184 (FIG. 5) at T4 time and into the random address register 115. At T5 time of the same cycle, the blank detect trigger 116 will signal that no address has been stored in word 142.

The conditions imposed on the AND circuit 188 (FIG. 8) are satisfied at logic gate 11 such that the directory address reservoir memory sequence will be initiated by a memory sequencer 190 (FIG. 9). At this point the directory address reservoir control 120 has been decremented to 564 and the memory sequencer has been stepped. At this point, the appropriate read driver AND circuit 192 (FIG. 9) will be energized to initiate read-out of the directory address reservoir word 564.

The address at word 564 of the directory address reservoir 118 will be gated through the sense amplifier AND circuits 196 (FIG. 9), through the OR circuits 182 (FIG. 7), onto the directory address bus (read) 114, through the AND circuits 184, at T4 time, and into the random address register 115. At T5 time of the cycle, the contents of the random address register 115 will be interrogated for blanks. However, having significant digits in the random address register 150, these digits will be passed to the directory address bus (write) 128 by way of the bit driver AND circuits 198 and into address 142 of the address sectors 112. By reference to FIG. 3, it will be seen that the digits that have been passed from the directory address reservoir position 164 of the directory address reservoir 118 to the random address register 115 and into word 142 of the address structures are the digits 280.

As the contents of the random address register 115 are transmitted to the address sectors 112, the same information is also gated through the OR circuits 172 (FIG. 6) and through the AND circuits 174, at T6 time, to the indirect address register 106. By reference to FIG. 3, it can be seen that the digits now in the indirect address register 106 are 28.

At logic gate 12, the units order of the identifier register 104 will be gated through AND circuits 202 (FIG. 7), through the OR circuits 160, through the AND circuits 162 and into the directory memory address register 110. At the same time, the two digits 2 and 8 in the indirect address register 106 will be gated through the AND circuits 162 to the hundreds and tens positions, respectively, of the directory memory address register 110, such that, in accordance with the present example, the digits 283 are now in the directory memory address register 110. As the units order of the identifier register 104 was gated through the AND circuits 202, an AND circuit 204 was energized at T1 time and a final iteration trigger 206 (FIG. 7) was turned on. The output of the final iteration trigger 206 signifies that the last position of the address structure is to be determined.

The contents of the directory memory address register 110 are transmitted to the decoder 176 and are gated through the appropriate read driver AND circuits 178 to gate the information out of word 283 of the address sectors 112. This information is gated through the sense amplifier AND circuits 180, through the OR circuits 182, onto the directory address bus 114 and at T4 time through the AND circuits 184 to the random address register 115. At T5 time of this cycle (logic gate 12), the AND circuit 186 will interrogate the contents of the random address register 115 for blanks. Since no significant digits were sensed from word 283 of the address sectors 112, the blank detect trigger 116 will signify the blank condition.

At logic gate 13, T2 delay time of the cycle, an AND circuit 208 (FIG. 8) will emit a pulse to start the random memory address reservoir sequence by energizing a memory sequencer 209. This function is initiated by the fact that the signal FINAL ITERATION is an input to the AND circuit 208. The random memory address reservoir register 126 (FIG. 9) is at word 721 of the random memory address reservoir 124. This condition is decoded by decoding circuits 210 at the proper time of the memory sequence. The decoder output will gate read driver AND circuit 211. The address at word 721 of the random memory address reservoir 124 is now gated through sense amplifier AND circuits 212 (FIG. 9), through the OR circuits 182 (FIG. 7) and onto the directory address bus (read) 114 by which it is transmitted through the AND circuits 184, at T4 time, to the random address register 115. The contents of the directory memory address bus (read) 114 are available at this time to the random memory control unit as a random address at output 214 of the OR circuits 182 (FIG. 7). At T5 time of logic gate 13, the AND circuit 186 will interrogate the contents of the random address register 115 for a blank condition. However, random address 016 has been obtained from word 721 of the random memory address reservoir 122, such that the blank condition does not prevail and the blank detect trigger 116 will remain off.

The contents of the random address register 115 will be routed over the directory address bus (write) 128 to the directory memory address sectors 112 by way of the bit driver AND circuits 198. The directory memory address register 110 is at word 283, therefore, the decoder 176 will translate to drive a proper write driver AND circuit 216 to store the contents of the random address register 115 into word 283 of the address sectors 112.

It has been stated that each time an address in either the directory address reservoir 118 or the random memory address reservoir 124 is interrogated, the directory address reservoir control circuits 120 and the random memory address reservoir control circuits 126, respectively, are either incremented or decremented by the one-up/one-down circuits 121 (FIG. 3). In the example used above, these circuits were decremented such that the directory address reservoir 118 was stepped from 565 to 564 and finally to 563, and the random memory address reservoir 124 was stepped from 721 and will finally be stepped to 720. Specifically, during the instruction time at which the AND circuit 188 (FIG. 8) is energized, its output will be fed through an OR circuit 218 (FIG. 8) whose output will gate a "one" generator 220. The output of the "one" generator 220 is gated through a true complement circuit 222 to an adder circuit 224. An OR circuit 226 is gated at instruction time to inform the true complement circuit 222 that a decrementing operation is to be performed. The result is a subtraction in the address controls.

The output of the directory address reservoir register 120 (FIG. 8) is fed through AND circuits 228 due to the fact that the output of the AND circuit 188 is up. The output of the AND circuits 228 is passed through OR circuits 230 and to the adder 224. The output of the adder is gated through AND circuits 236 and back into the random memory address reservoir register 126. This results in decrementing the directory address reservoir control 120 by one.

During a final iteration, the output of the random memory address reservoir register 126 (FIG. 9) will be gated through AND circuits 234 and through the OR circuits 230 which will transmit these outputs to the adder 224. The outputs of the adder 224 are now gated through the AND circuits 236. Because the operation which is being performed is a final iteration, as determined by an OR circuit 238, the output of the AND circuits 236 feeds into the input of the random memory address reservoir register 126.

Heretofore, the nature and function of the memory sequencers 165, 190 and 209 were functionally described with the forecast that their nature would be more specifically illustrated and described. FIG. 20 shows the nature of these sequencers more specifically. Since the memory sequencers are identical, the specific circuit of FIG. 20 can be described as though it were the memory sequencer 165 which is associated with the directory memory address register. For purpose of explanation, it should be noted that the timing sequence is broken into nine sections and that the signal on the input line to the memory sequencer is START MEMORY. The start memory pulse is up from 0 to 1 time and it activates a delay unit 240. When the output pulse of the delay unit 240 drops, a read trigger 242 will be turned on. The output of the read trigger is the signal READ PULSE. The signal READ PULSE will be up from approximately 0.5 to 3.5 of the cycle, and it will activate one leg of the read driver AND circuit 178. The read pulse will also activate a delay unit 244 which, in turn, will set off a single shot multivibrator 246. The output of the single shot multivibrator 246 is the signal STROBE PULSE, which is present from 1.8 time to 2.8 time of the cycle. The strobe pulse will energize one leg of the sense amplifier AND circuit 180. A second delay unit 248 will reset the read trigger 242. In the meanwhile, the start memory line has also activated a delay unit 250. The fall of the pulse from the delay unit 250 will turn on a write trigger 252. The output of the write trigger is the signal WRITE PULSE, which is up from 6 to 9 times of the cycle. This signal is utilized to activate one leg of the write driver circuits 216. The write pulse will also activate a delay unit 254 which, in turn, will set off a single shot multivibrator 256. The output of the single shot multivibrator 256 is the signal GATE SET, which is up from approximately 7.5 to 8.5 time of the cycle. The signal GATE SET is utilized to activate one input of the bit driver AND circuit 198. Another delay unit 258 is activated by the signal WRITE PULSE to reset the write trigger 252.

The read driver AND circuit 178 will provide full current for read out of cores to the sense amplifier AND circuit 180. When reading into the cores, half a current will be provided by the write driver AND circuit 216, and the other half current will be supplied from the bit driver AND circuit 198. The bit driver AND circuit 198 is activated by the directory address bus (write) 128.

At this point, the operation "S," the type "X" and the identifier 00123 have been transferred along the computers' main information bus (write), through a character register (in) 260 which has made a proper distribution of this data to the operation register 100, the type register 102 and the identifier register 104 of the directory addressing unit 105 (see FIGS. 1A and 1B). It has been shown how directory memory addresses have been structured under control of a customer's identifier and made available to the control circuits. It now remains to be seen how the random memory address is manipulated to initiate and control the flow of a record from the computer core memory 321 to the random access memory 297. A preliminary broad view of this operation can be obtained by continued reference to FIGS. 1A and 1B.

The random address 016 is placed into the random memory control unit 262 by way of the directory address bus (read). This renders the random address available for the selection of an access mechanism register to which the random address is to be transferred. The access mechanism registers 268 are composed of a plurality of sections 294. When an appropriate random access mechanism register section has been selected, the random address 016 together with a transfer address which may be assumed to be an end bit will be transmitted to the access mechanism registers to be interrogated for validity of the address. The information flow is onto a random access memory bus (out) 264, through the character register (in) 260, onto a control bus 266 and into the access mechanism registers 268. The random address will be compared with the random address in the random access mechanism, the address registers, and the transfer address portion of the information received from the random access memory will be put into the access mechanism address registers.

The system is conditioned for transfer of data from the computer core memory 321 to the random access memory 297 when the validity of the address has been established. The data will pass along the main information bus (write) to the character register (in) 260, along the control bus 266 to a character register (out) 270, to the random memory bus (in) and to the selected block of the random access memory 297.

The character register (in) 260 will be interrogated at each cycle to keep a character count in a character counter 272. When the character counter 272 reaches six, it will step the logic gate and word count circuit 136 in order to keep a word count on the data being transmitted. When the logic gating and word count unit 136 have counted fifteen words, the END OF BLOCK signal (E/B) generated in a unit 274 will indicate that the selected block 016 of the random access memory has been filled. The END OF BLOCK signal is initiated by the count output of the logic gating and word count circuits 136 and is established by the end of block circuitry 274. If, during the storage of information from the computer memory, an END OF RECORD signal (E/R) is sensed by an end of record signal unit 276, the transfer of data will be terminated and the remaining portion of random access memory block 016 will be filled with blanks. Blanks are produced by a blank generator 278 and they are gated through the characted register (out) 270 and into the random access memory.

When an END OF BLOCK signal is received and if an END OF RECORD signal is also present, the end bit in the access mechanism registers will be interrogated by the end bit signal circuits 280 terminating the storing operation. However, in the presence of an END OF BLOCK signal and the absence of and END OF RECORD signal, a new random address must be established.

A specific understanding of the data transfer mechanism can be obtained by reference to the circuits of FIGS. 10 through 12 and the timing diagram of FIGS. 15 through 17. It has been stated above that the random address 016 is on the directory address bus (read) 214 (FIG. 11). This address will be transmitted through AND circuits 282, at T4 time, logic gate 13, and it will be delivered to the random memory control unit register 262. Another input of AND circuits 282 is energized by an address transfer trigger 284 due to the fact that the operation is at I time and at logic gate 13. At logic gate 13, T5 time, the output of the random memory control unit register 262 will be interrogated for an end bit by the end bit AND circuit 280. At T6 time of the cycle, a portion of the random memory control unit register output will be used to establish the access mechanism register to be selected.

Assume, for example, that the access mechanism register M 294 is to be selected. Such selection will be under the control of pairs of AND circuits and triggers; one such pair being an AND circuit 288 and a trigger 290 at the top of FIG. 12. The selection of the access mechanism is determined from bits that are passed through the AND circuit 288, for example, at T6 time, which turn on the trigger 290. The output of the trigger 290 activates one input of an AND circuit 292. The remaining bits of the random memory control unit register 262 are transmitted to AND circuits 292 on the directory address bus (write).

At logic gate 14, T3 time, the output of the AND circuits 292 will set the access mechanism register M 294. At T7 time of logic gate 14, the contents of the access mechanism register 294 will be gated through AND circuits 296 onto the address bus to the random access memory. In the random access memory (FIG. 12), a seek trigger 298 will be turned on by the output of the AND circuits 296. When the seek trigger 298 is turned on, it will energize one input of an AND circuit 300 to gate the random address into a random access memory select register 302. For an indeterminate period of time, the random access memory will seek an access mechanism capable of processing the 016 random address. When this seek is completed, an AND circuit 304 will route the signal SEEK COMPLETE back to the control circuits.

The signal SEEK COMPLETE will indicate that the random access memory address should now be read. A signal READ RAM ADDRESS on a line 306 (FIG. 11) will energize one input of AND circuits 308 (FIG. 12) whose outputs will gate the contents of a RAM output register 309 from the random output bus 264. The random address in the RAM output register 309 is 016. The characters will be passed through OR circuits 310 (FIG. 10) and through character register (in) 260, along the control bus 266 and through the AND circuits 308 (FIG. 12).

The output of AND circuits 308 will be compared with the contents of the access mechanism register 294. This comparison is performed in an exclusive OR circuit 312. At T2 time, an AND circuit 314 will indicate the equality of the two addresses. During the next two machine cycles, the transfer address will be monitored. The transfer address will be gated from the random access memory output register 309 onto the random access memory output bus 264, through the OR circuits 310 and to the character register (in) 260. The character register (in) 260 output will be on the control bus 266 and will be routed to AND circuits 316. The AND circuits 316 will gate the character through OR circuits 318 to a transfer address register 320. The remaining portion of the transfer address will be routed from the random access memory to the transfer address register 320 on the next succeeding machine cycle in the same manner.

The system is now conditioned and ready to transfer data from the computer memory to the random access memory. During logic gate 13 at T5 time, the AND circuit 280 (FIG. 12) is interrogated for an end bit. The signal NOT E/B, which is the output of the AND circuit 280, is used to turn on a read-write trigger 261 (FIG. 11). The output of the read/write trigger 261 energizes one input of an AND circuit 263. When the access mechanism register receives the random address in the random address register 294, a trigger AMR ready 265 was turned on and the output thereof gates the signal GATE SERVICE REQUEST from the AND circuit 263. At T7 time, an AND circuit 267 (FIG. 10) will gate the signal GATE SERVICE REQUEST through an OR circuit 269. This effectively turns on a service request trigger 322.

The output of the service request trigger 322 will turn on a service trigger 324 in the computer and gate the first character of the record from the computer data register 326 into the computer's main information bus (write) 228. The character will be routed through the OR circuits 310 which will gate it into the character register (in) 260. The character will proceed along the control bus 266 through OR circuits 330 and into the character register (out) 270. From the character register (out) 270, the character will pass through AND circuits 332 and into a random access memory input register 336 from which it is transmitted to the random access memory sector.

While the character is on the control bus 266, it is interrogated for an end of record character in an AND circuit 338 (FIG. 10) which controls an end of record trigger 346. It is also routed through an AND circuit 340 (upper portion of FIG. 10). The output of the AND circuit 340 gates the binary character count triggers 272.

The description of the data transfer operation thus far has explained the transfer of the first character from the computer memory to the random access memory. Subsequent character transfers in the normal course are accomplished in exactly the same manner and no irregular functions take place until the transfer of the last character, i.e., the sixth. When the last character is transferred, the character count triggers 272 (FIG. 10) will indicate the processing of the sixth character at which time the end of word functions must be performed.

When the character count triggers 272 contain a count of six, they will transmit a pulse through an OR circuit 342 and turn on the logic gate triggers 136. These triggers will signal that a word has been processed. When the character count triggers 272 have counted to six for the fifteenth time and, therefore, have stepped to logic gate 15, an end of sector will be signalled.

Specifically, at the presence of logic gate 15, the character count of six, and T3 time, a pulse will pass through an AND circuit 344 to turn on the end of sector trigger 274. The END OF SECTOR signal will indicate the completion of operation on the selected memory sector and the control circuits will, therefore, be required to determine whether the storing operation has been completed or whether further operations are necessary. For the purpose of this description, it may be assumed that a complete record has been stored and that no further operations are required.

Let it be assumed that the sixth character of the fourteenth word was an end of record mark. When the end of record mark is put into the character register (in) 260 (FIG. 10), it will be on the control bus 266. The AND circuit 338 (FIG. 10) will detect the end of record mark and turn on the end of record trigger 346. The end of record trigger will turn on an end trigger 348. The output of the end trigger 348 will be transmitted back to the computer for its information. This signal will turn off a write command trigger 349 in the computer. In turn, the output of the write command trigger 349 will fire a single shot multivibrator 351 which generates an output signal END RESPONSE, which is returned to the control circuits to turn off the end trigger 348, a start 353 and an operational (in) trigger 355.

The controls must now generate six blanks to fill out the fifteenth word of the memory sector. These blanks are generated as follows: The end trigger 348 will also transmit a pulse through an OR circuit 350 to turn on an emit blank trigger 352. The output of the emit blank trigger 352 will pass through an AND circuit 356, the output of which will turn on a gate blank trigger 354 at each T5 time. The gate blank trigger 354 will energize the blank generator 278. The output of the blank generator 278 and the output of the emit blank trigger 352 are passed through AND circuits 358 as blank characters. These blank characters will pass through the OR circuits 330 to the character register (out) 270 and from there they will assume the same path as the data from the computer to the random access memory which has heretofore been traced.

The blanks that are generated are counted in the same manner as data which is transmitted from the computer. Therefore, when the character count triggers 272 (FIG. 10) have counted six blanks, the logic gate triggers 136 will be stepped to logic gate 15, and the end of sector trigger 274 will be turned on.

At this time the end of record trigger 346 and the end of sector trigger 274 are both on. The respective outputs E/R and E/S are inputs to an AND circuit 360 (FIG. 12) which will generate an output to an emit transfer address trigger 362. The transfer address trigger 362 will transmit a pulse through an OR circuit 364 which effectively gates AND circuits 366. The other input to the AND circuits 366 has the contents of the transfer register 320 thereon. Therefore, the contents of this register will now be gated through the AND circuits 366, through OR circuits 182 (FIG. 11) onto the directory address bus (read) 214, through the AND circuits 282 and into the random memory control unit register 262.

The output of the emit transfer address trigger 362 (FIG. 12) also activates the OR circuit 283 (FIG. 11) thereby turning on the address transfer trigger 284 to make possible the gating of the transfer address through AND circuits 282. The output of the random memory control unit register 262 will be monitored by AND circuit 280 and the presence of an end bit will be detected. In the assumed example, an end bit is now present. It will be remembered that the end of record trigger 346 (FIG. 10) and the end of sector triggers are on. Therefore, the input conditions to an AND circuit 368 (FIG. 12) are satisfied and the output of the AND circuit 368 will signal the end of the operation.

It should be noted that the service request trigger 322 (FIG. 10) will turn on the service trigger 324. While the service trigger 324 is gating a character from a data register 326, it is also effective to start a single shot multivibrator 325. The output of this single shot multivibrator is the signal SERVICE RESPONSE which will reset the service request trigger 322.

It is thus seen how an addressable memory is structured with the directory control circuits and how the RAM address associated with this structuring is manipulated to control the flow of data from the computer memory to the random access memory. A more complete understanding of the operation can be attained by at least briefly considering a retrieval operation during which data is taken from the random access memory and stored in the computer memory. In the following, a brief functional description will be undertaken with reference to the flow diagram of FIG. 4 and the block diagram of FIGS. 1A and 1B. The detail circuit description will be rendered with reference to FIGS. 13 and 14 and the timing diagram of FIGS. 18 and 19. The control circuits of FIGS. 5, 6 and 7 which were employed during the store operation are also employed during the retrieval operation with the exception that certain timing changes are required. Consequently, the AND circuits 166, 170, 200, 202 (FIG. 7) and 412 (FIG. 5) have applied a pair of logic gate legends to their respective inputs. The logic gate legend above the input lines represents the input signals during a storing operation, while those enclosed in brackets under the lines identify the inputs during the retrieval operation.

*General description of address structuring operation during data retrieval*

Figure 4:
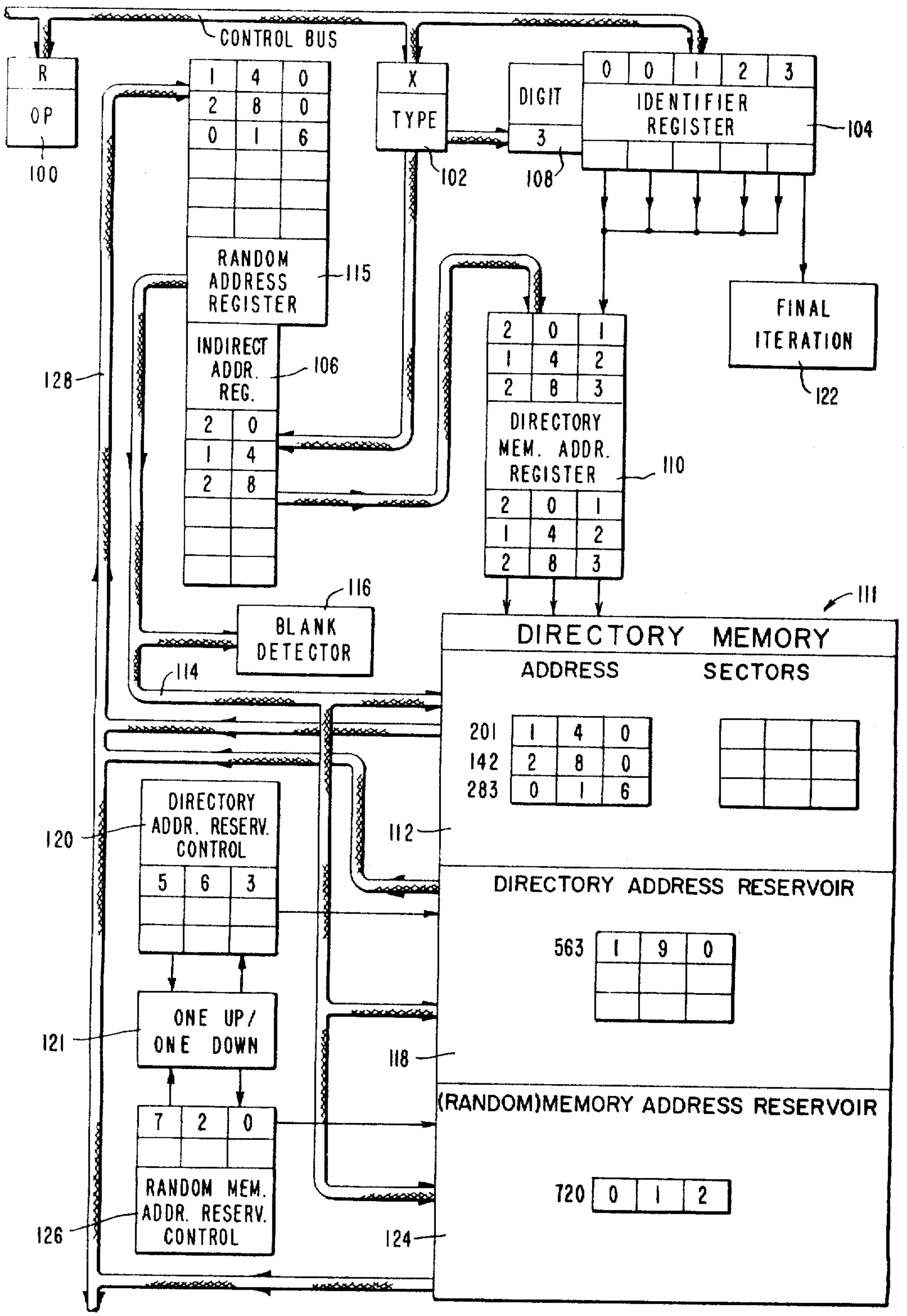
FIG. 4 is a schematic representation of address manipulation during a data retrieval operation.

Let it be assumed that data has been stored in block 016 of the random access memory 297 and that it is desired to locate this data and return it to computer core memory 321, beginning with memory location 080 (see FIG. 4). The computer will transmit an instruction to the control circuits indicating that the operation is a retrieval operation, that the type of operation to be performed is an inventory operation, that the customer's identifier is 123, and that the data is to be returned to 080 of the computer memory. This instruction is sent to the directory addressing unit from where a block address of the random access memory 293 must be retrieved. The contents of the type register 102 will be used again to derive a part of the first address in the address structures 112. A portion of the type register character will be translated by the digit circuits 108 in order to put the hundreds order of the identifier into the units order of the directory memory address register 110. The rest of the type character will be used to form the initial contents of the indirect address register 106. The type code from the register 102, for example, effectively places the digits 20 into the indirect address register 106. Thus, as in he original store operation, the initial partial address is 20, as now indicated by the indirect address register 106. The indirect address register and the hundreds position of the identifier register 104 are read out and stored in the directory memory address register 110. The address (140) at word 201 of the address sectors 112 is read out and is stored in the random address register 115. The blank detector 116 has determined that word 201 is not blank.

The indirect address register 106, now standing at fourteen (the first two digits of the sector address 140) and the tens position, the 2, of the identifier register 104 are read out and stored in the directory memory address register 110.

The address (280) at word 142 of the address sectors 112 is read out and stored in the random address register 115. During this operation, it is also ascertained that this word is not blank.

Once more the indirect address register 106 and the units position of the identifier register 104 are read out and stored in the directory memory address register 110, such that the word 283 is now available.

The address (016) at word 283 of the address sectors is read out and stored in the random address register 115. This word contains an address and the blank detector 116 so indicates. Since this is the final iteration, the addressing operation is completed. The random memory address 016 now in the random address register 115 is available to control the retrieval and transmission of the data from the random access memory.

In FIGS. 1A and 1B, the random memory control unit 262 checks for an end bit in the random address of the instruction. Since there is no end bit, it selects an available access mechanism which can service the instruction and routes the instruction to it. The access mechanism positions itself at block 016 of the random access memory and reads the block address which it checks against the address in the register and the transfer address position of the sector which it stores in the transfer address position of the register. Word-by-word data is transferred to the computer core memory, beginning at location 080. Data transmission is stopped by the end of sector signal. At this time the computer address in the access mechanism register 268 stands at 094; the address where the next data word will be put.

*Retrieval controls*

As before, the random address 016 is on the directory address bus (read) 214 (FIG. 11). This address will be gated through the AND circuits 282 into the random control unit register 262. In order to gate the address through the AND circuit 282, the address transfer trigger 284 must be turned on. The address *transfer trigger* was turned on at logic gate 8 by the pulses I time at T1 time. The output from an AND circuit 370 is passed through the OR circuit 283 to turn on the address transfer trigger 284. A portion of the contents of the random memory control unit register 262 is now used in the access mechanism register select area 286 (FIG. 12). At T6 time, the AND circuit 288 interrogates the random memory control unit register 262 for information and turns on the access memory register M select trigger 290.

The output of the trigger 290 energizes one input of the AND circuits 292. The remainder of the contents of the random memory control unit register 262 is now gated through the AND circuits 292 to the random address register 294. The output of the random address register 294 is routed through AND circuits 296 to the address bus and to the random access memory. When the outputs of AND circuits 296 are up, the seek trigger 298 is turned on with the result that the AND circuit 300 is gated by the signal SEEK, thereby permitting the random address to be placed in the select register 302.

An indeterminate time will again lapse to permit execution of the seek order during which the access mechanism seeks and finds the proper memory block. When the seek operation is completed, AND circuit 304 will be energized to send a signal SEEK COMPLETE back to the control circuits. The block address is now read from the random access memory and into the random access memory output register 309 (FIG. 13). This address is now routed along the random access memory output bus and through the OR circuits 310 (FIG. 14) to the character register (in) 260. From this point, it is routed onto the control bus 266 and through the AND circuits 308 (FIG. 13) which are gated by the signal READ RAM ADDRESS, which is also an input to the AND circuits 316. The exclusive OR circuits 312 compare the output of the AND circuits 308 and the random address register 294. If the data at both is equal, the AND circuit 314 will signify block address and random address equal.

On the next machine cycle, the first half of the transfer address will be routed from the random access memory to the random access memory output register 309 (FIG. 13), through the OR circuits 310 (FIG. 14) and into the character register (in) 260. The address is routed along the control bus 266 and through the AND circuits 316 (FIG. 13) from whence it is transmitted through OR circuits 318 to the transfer address register 320. On the next cycle, the second half of the transfer address will be transferred from the random access memory to the transfer address register 320 in the same manner.

With the fall of the signal READ RAM ADDRESS (FIG. 13), the data following will be the data that will be transferred to the computer. This data will be transferred from the random access memory to the random access memory output register 309 along the random access memory output bus 264, through the OR circuits 310 (FIG. 14) and into the character register (in) 260. At this time the first character of data is on the control bus 266.

The AND circuit 380 (FIG. 14) is interrogated at logic gate 8 for the presence of an end bit. Since no end bit is present in the random memory control register 262 at this time, a read/write trigger 261 (FIG. 13) is turned on. When the access mechanism register 294 (FIG. 13) receives a random address, the AMR ready trigger 265 (FIG. 13) is turned on. With these two conditions prevailing, the AND circuit 263 will emit an output which is the signal GATE SERVICE REQUEST. The signal GATE SERVICE REQUEST is gated through the AND circuit 267 (FIG. 14) and through the OR circuit 269 where it effectively turns on the service request trigger 322. The service request trigger 322 energizes the service trigger 324 in the computer. When the service trigger 324 is on, it is effective to gate the computer input register 372 to receive data.

We are again reminded that the first character of data is on the control bus 266. It is, therefore, routed through the OR circuits 330 (FIG. 14) and into the character register (out) 270. Since this is a retrieval operation, the AND circuits 374 gate the output of the character register (out) 270 into the main information bus (read) 375, such that the first character of data is transmitted into the computer input register 372 (FIG. 14).

Data as it is gated onto the control bus 266 is monitored by the AND circuit 340 (FIG. 13) and the output of AND circuit 340 will step the character count triggers 272. When the character count triggers 272 reach a count of six, a signal is transmitted through the OR circuit 342 to step the logic gate triggers 136 in order to keep track of the words that have been processed. Let it be supposed that at logic gate 14, character count six, there will be an end of record mark. With the end of record mark on the control bus 266, the AND circuit 338 (FIG. 14) will detect its presence and will emit a pulse which will turn on the end of record trigger 346. When the end of record trigger 346 is turned on, its output will turn on the end trigger 348. The output of this latter trigger will be routed to the computer where it is a reset to the read command trigger 376. The fall of the read command trigger 376 will fire the single shot multivibrator 351 whose output is the signal END RESPONSE, which is utilized to reset the end trigger 348, the start trigger 353 and the operational (in) trigger 355.

The end of record mark will be the last character transmitted to the computer. The blanks that may follow will be routed as far as the control bus 266 in order that the character count triggers 272 (FIG. 13) may be stepped with the resultant stepping of the logic gate triggers 136 until the end of the sector is detected. In the presence of logic gate 15, a counter count of six and at T3 time, the output of the AND circuit 344 (FIG. 13) will turn on the end of sector trigger 274. The END OF SECTOR signal, the absence of the signal SEEK, and the next TO pulse will turn off the read/write trigger 261. The NOT SEEK signal (FIG. 13) which is transmitted through an OR circuit 380 and an AND circuit 382 will turn off the read/write trigger 261. Since the signals END OF RECORD and END OF BLOCK have been detected, AND circuit 360 (FIG. 14) to which these signals are an input will transmit a pulse to turn on the emit transfer address trigger 362. The output of the emit transfer address trigger will be transmitted through the OR circuit 364 and will gate the AND circuits 366 such that the contents of the transfer address register 320 will pass through the AND circuits 366, through the OR circuits 182 (FIG. 14) and to the directory address bus (read) 214.

The output of the emit transfer address trigger 262 will also be transmitted through the OR circuit 283 (FIG. 14) to turn on the address transfer trigger 284. With this trigger on, the contents of the transfer address bus (read) will be routed through the AND circuits 282 and into the random memory control unit register 262.

At the next T5 time, the AND circuit 280 (FIG. 14) will interrogate the random memory control unit register 262 for an end bit. In the presence of an end bit and an END OF RECORD signal, the AND circuit 368 will transmit the END OF OPERATION signal.

There are numerous methods of initiating an operation for the transfer of information which methods vary from machine to machine. A suitable method is illustrated in FIG. 5. If the computer is not busy, an Op/Out trigger 384 will be turned on. Its output will be transmitted to a ready AND circuit 386. If the random access memory is not in use, a ready trigger 388 (FIG. 7) will also be on. The output of the ready trigger 388 will be routed to an AND circuit 390 (FIG. 5) and if the computer controls are not busy, the signal NOT BUSY will be impressed on the second input of the AND circuit 390. As both inputs to the AND circuit 390 are energized, its output will turn on an Op/In trigger 392. The output of the Op/In trigger will be transmitted to an AND circuit 394. This input, together with the input Op/Out, which is a product of the Op/Out trigger 384, together with the signal NOT STOP, conditions the AND circuit 394 to emit an output which will turn on a command trigger 396. The command trigger 396 can be interpreted as a command to read or as a command to write depending on the operational mode that the computer chooses. The appropriate command line will be connected to the control circuits through an OR circuit 398 and will gate one leg of the AND circuit 400.

The output of the ready AND circuit 386 energizes a second input of the AND circuit 400. Therefore, at the next T3 time, the AND circuit 400 will produce an output to turn on a single shot multivibrator 402. The single shot multivibrator 402 will issue a signal INITIAL RESET to the control circuits which will reset all circuits throughout the system to an initial condition. The fall of the output of the single shot multivibrator 402 will fire a second single shot multivibrator 404 which, in turn, will turn on the start trigger 353. The output of the start trigger 353 will serve as a command response to the computer and will also gate an AND circuit 406 to turn on the I time trigger 134 (FIG. 6).

In furtherance of the description of the directory operation, it should be pointed out that during I time, the service request trigger 322 (FIG. 5) is used to gate the instruction characters from the computer to the directory. This is done in the following manner: An AND circuit 408 is energized by the presence of I time, logic gates 1 through 7 and the T7 time pulse. The output of the AND circuit 408 is routed through the OR circuit 269 to turn on the service request trigger 322. The output of the service request trigger 322 is the signal SERVICE REQUEST, which is used to turn on the service trigger 324 (FIG. 5). This latter trigger gates the instruction information out of the computer's data register 326 onto the main information bus and through the OR circuit 310 and into the character register (in) 260.

By the time the service trigger 324 is turned on, the single shot multivibrator 325 generates a service response which will be returned to the control circuits to turn off the service request trigger 322. The service request and the service response sequences will be repeated until the transfer of the data is completed.

A D time trigger 410 (FIG. 5) is used to define the cycles which are used in constructing an address structure. The D time trigger 410 is turned on at logic gate 4 and during instruction time. During a store operation, the D time trigger is reset at logic gate 13 through the AND circuit 412. During a retrieval operation, the D time trigger is reset at logic gate 8.

It can be seen from the foregoing that the system herein generates augmented indirect addresses to translate the customer's data identifier into specific memory addresses. In performing these functions, address structures are formed in the directory memory which then contains the paths necessary to associate the customer's data identifiers with specific machine addresses. In this regard, it should be noted that the customer's identifiers are never actually stored in the directory memory. On the other hand, they are used as a key in following the paths through the address structures.

The customer need not know where his data is stored and indeed he never deals directly with machine addresses. As a result, he is not required to keep track of what part of memory is in use and what part is free. This is done automatically by the system as shown above. This eliminates a significant source of human error, since actual memory assignment and actual machine addressing is done by the machine system. Therefore, the memory assignment and addressing is not dependent upon the system user knowing what areas are assigned and what areas are free. Nor is he dependent upon his use of correct machine addresses. Particular areas of memory can be reached only through a unique path through the address structures. If through error, reference is made to the wrong address structure, or the wrong part of an address structure, there is an excellent chance that such erroneous request can be detected as invalid.

The invention herein has been shown as embodied in a system utilizing binary coded decimal values, that is to say, the radix of the numbers used is "10." It should be obvious to one skilled in the art that the invention could equally well be embodied in systems having a larger or smaller radix. For instance, binary values could be utilized four columns at a time so as to provide a hexidecimal system (radix 16), or three columns at a time so as to provide an octal system (radix 8), or in single columns so as to provide a full binary system (radix 2). The choice of the radix depends in large part upon the hardware which is to be utilized, and on the type and size of identification numbers which may be most advantageous. The choice of the radix, the hardware and the implementation of any particular embodiment is left to those skilled in the art.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system having data storage means under control of a customer's data identifier: an addressable memory having data storage sectors therein each having a unique address associated therewith, a directory memory adapted to contain unassigned addressable memory sector addresses, a directory memory address register adapted to receive intermediate addresses, means for storing a customer's program including in said program a unique data identifier unrelated to said addresses associated with said addressable memory, means for forming a preselected plurality of intermediate addresses of selected parts of a customer's data identifier and selected parts of an address taken from said directory memory to generate a random table of intermediate addresses in said directory memory address register, and means responsive to the formation of the last of said intermediate addresses for selecting the next unassigned addressable memory address in said directory memory.

2. The system of claim 1, having means therein for forming an initial intermediate address of a selected part of a customer's data identifier and a plurality of characters selected at random.

3. The system of claim 1, having means therein for forming an initial intermediate address of a selected part of a customer's data identifier and a plurality of characters selected from a customer's stored program.

4. The system of claim 1, wherein address sectors are disposed in random order in said directory memory.

5. The system of claim 1, having therein means connecting said directory memory address register to said directory memory for interrogating storage sector addresses in said directory memory.

6. The system of claim 1, having therein means responsive to the selection of said next unassigned addressable memory address for establishing access to the memory data storage sector at said addressable memory address.

7. The system of claim 1, having means therein for forming a plurality of intermediate addresses in succession prior to the storage of data into an addressable memory sector.

8. The system of claim 1, having means therein for interrogating directory memory sectors having addresses corresponding to said intermediate addresses.

9. The system of claim 1, in which the number of preselected plurality of intermediate addresses is determined by the number of characters of a customer's data identifier preselected for the formation of said intermediate addresses.

10. The system of claim 1, in which said directory memory is divided into address sectors, a directory address reservoir and a memory address reservoir, in which said address sectors have addresses associated therewith at random, and in which said directory address reservoir and said memory address reservoir have storage sectors having, respectively, consecutively numbered storage sectors.

11. The system of claim 1, having therein a customer's data identifier register and a final iteration detection circuit connected thereto, and means under the control of said latter circuit upon the formation of the last of said plurality of intermediate addresses for establishing access to said memory data storage sector at said addressable memory address.

12. The system of claim 1, in which said directory memory is divided into address sectors, a directory address reservoir and a memory address reservoir, in which said address sectors have random addresses associated therewith, said directory address reservoir and said memory address reservoir have storage sectors having, respectively, sequentially numbered storage sectors, and means connected to said reservoirs for incrementing and decrementing the same.

References Cited by the Examiner

UNITED STATES PATENTS 3,036,773 5/1962 Brown ----------- 340—172.5

OTHER REFERENCES

The Univac 1107 Thin Film Memory Computer—General Description, 1961, pages 10, 11, and 14.

ROBERT C. BAILEY, *Primary Examiner.*

P. L. BERGER, I. S. KAVRUKOV, *Assistant Examiners.*